US011172531B2

(12) United States Patent
Raghavan et al.

(10) Patent No.: US 11,172,531 B2
(45) Date of Patent: Nov. 9, 2021

(54) DYNAMIC SWITCHING BETWEEN DIFFERENT MULTIPLE INPUT MULTIPLE OUTPUT OPERATION MODES

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/790,425

(22) Filed: Feb. 13, 2020

(65) Prior Publication Data

US 2020/0314934 A1 Oct. 1, 2020

Related U.S. Application Data

(60) Provisional application No. 62/825,140, filed on Mar. 28, 2019.

(51) Int. Cl.
*H04B 7/0456* (2017.01)
*H04W 76/16* (2018.01)
(Continued)

(52) U.S. Cl.
CPC .......... *H04W 76/16* (2018.02); *H04B 7/0417* (2013.01); *H04B 7/0469* (2013.01);
(Continued)

(58) Field of Classification Search
CPC .. H04B 7/0417; H04B 7/0465; H04B 7/0469; H04B 7/0617; H04B 7/0626;
(Continued)

(56) References Cited

U.S. PATENT DOCUMENTS

2015/0312958 A1* 10/2015 Cheng ................... H04L 5/0048
370/252
2017/0373789 A1* 12/2017 Huang ................. H04B 7/0452
2018/0213456 A1* 7/2018 Jheng .................... H04W 76/15

FOREIGN PATENT DOCUMENTS

WO WO-2018004844 A1 1/2018
WO WO-2018175002 A1 9/2018

OTHER PUBLICATIONS

International Search Report and Written Opinion—PCT/US2020/018269—ISA/EPO—dated May 11, 2020.

* cited by examiner

*Primary Examiner* — Minh Trang T Nguyen
(74) *Attorney, Agent, or Firm* — Holland & Hart LLP

(57) ABSTRACT

Generally, the described techniques provide for multiple input multiple output (MIMO) operation mode configuration (e.g., configuration of spatial MIMO, polarization MIMO, or both, across one or more antenna modules of a user equipment (UE)) based on the UE characteristics, channel characteristics, or both. For example, a UE may determine channel characteristics, as well as UE characteristics, for MIMO operation mode configuration. The UE may then feedback, to the base station, MIMO operation information (e.g., channel characteristics, UE characteristics, a request for one or more MIMO operation modes determined by the UE, or some combination thereof) for MIMO operation mode configuration. The base station may receive the MIMO operation information and may determine one or more MIMO operation modes for the UE based on the received MIMO operation information, network conditions, or both. The base station may then transmit a MIMO operation mode configuration to the UE.

29 Claims, 21 Drawing Sheets

(51) Int. Cl.
*H04W 16/26* (2009.01)
*H04B 7/0417* (2017.01)
*H04B 7/06* (2006.01)
*H04W 24/10* (2009.01)

(52) U.S. Cl.
CPC .......... *H04B 7/0617* (2013.01); *H04W 16/26* (2013.01); *H04W 24/10* (2013.01)

(58) Field of Classification Search
CPC ........ H04B 7/063; H04B 7/0632; H04B 7/10; H04W 16/26; H04W 24/10; H04W 76/15; H04W 76/16
See application file for complete search history.

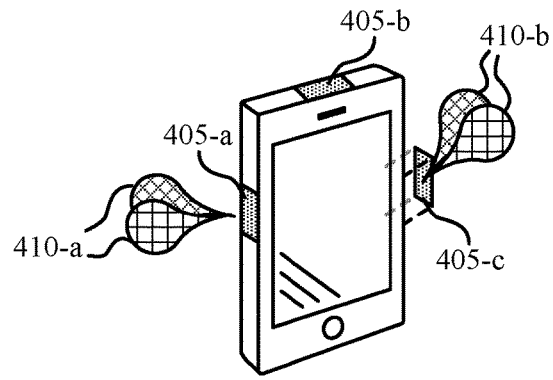
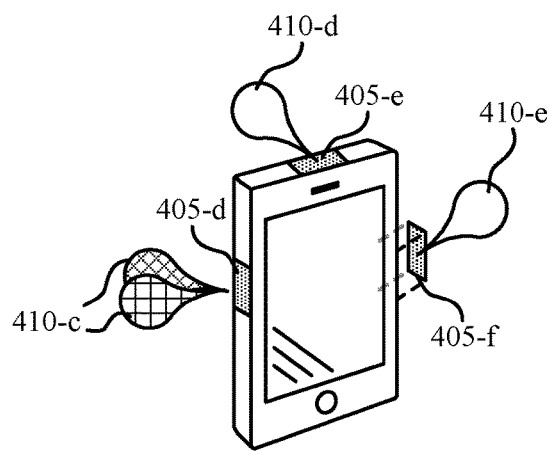
FIG. 4A
FIG. 4B
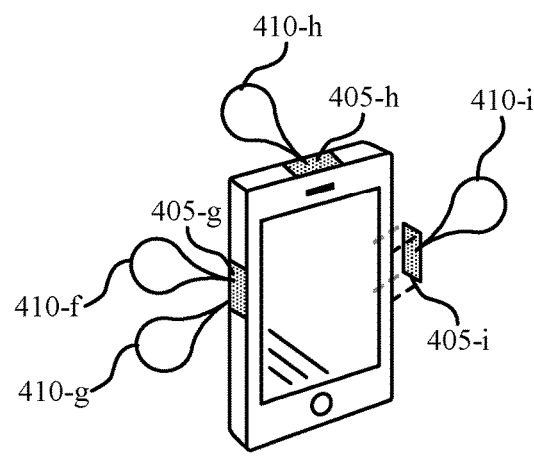
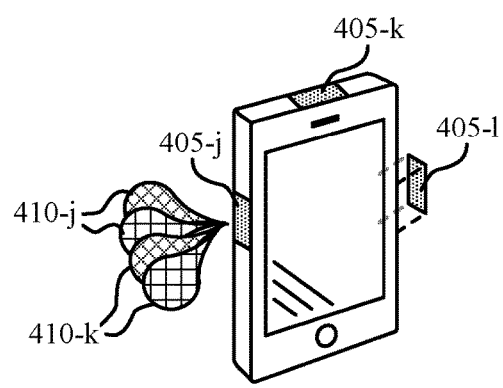
FIG. 4C
FIG. 4D

DYNAMIC SWITCHING BETWEEN DIFFERENT MULTIPLE INPUT MULTIPLE OUTPUT OPERATION MODES

CROSS REFERENCE

The present Application for Patent claims the benefit of U.S. Provisional Patent Application No. 62/825,140 by RAGHAVAN et al., entitled "DYNAMIC SWITCHING BETWEEN DIFFERENT MULTIPLE INPUT MULTIPLE OUTPUT OPERATION MODES," filed Mar. 28, 2019, assigned to the assignee hereof, and expressly incorporated herein.

BACKGROUND

The following relates generally to wireless communications, and more specifically to dynamic switching between different multiple input multiple output (MIMO) operation modes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may operate in millimeter wave (mmW) frequency ranges, e.g., 24 GHz, 26 GHz, 28 GHz, 39 GHz, 57-71 GHz, etc. Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration, and blockage losses in mmW communications systems, transmissions from the base station and/or the UE may be beamformed. Moreover, a receiving device may use beamforming techniques to configure antenna(s) and/or antenna array(s) and/or antenna array module(s) such that transmissions are received in a directional manner.

mmW networks may perform a variety of beam management/beam refinement procedures in order to monitor beam performance and identify potential candidate beams available for use if the current active beam becomes unavailable and/or deteriorates in signal quality below an acceptable threshold level. In some aspects, such beam management techniques may include a transmitting device transmitting multiple beamformed signals in a sectoral or sweeping manner around its coverage area. The receiving device may monitor for the beamformed signals and measure signal strengths using one or more receive beams. Conventionally, the transmitting device (e.g., a base station) may configure the receiving device to return channel measurements for a particular number of its beamformed signals. The receiving device identifies the particular number of transmit beams and corresponding receive beams having the strongest signal level and returns those to the transmitting device in a beam measurement report.

SUMMARY

The described techniques relate to improved methods, systems, devices, and apparatuses that support dynamic switching between different multiple input multiple output (MIMO) operation modes. Generally, the described techniques provide for MIMO operation mode configuration (e.g., configuration of spatial MIMO, polarization MIMO, or both, across one or more antenna modules of a user equipment (UE)) based on the UE characteristics, channel characteristics, or both.

For example, a base station and a UE may perform a beam training procedure, and a UE may determine channel characteristics, as well as UE characteristics, for MIMO operation mode configuration. Channel characteristics may include reference signal received power (RSRP) measurements associated with some set of beam indices, dominant clusters in a channel, blockage conditions at a UE, robustness thresholds, etc. For example, during a beam training procedure, a set of beam indices (e.g., some top K beam indices computed with either a RSRP, or reference signal strength indicator (RSSI), or signal-to-noise ratio (SNR), or signal-to-interference and noise ratio (SINR)) may be identified by a UE. Based on RSRP/RSSI/SNR/SINR measurements associated with the set of beam indices, the UE may determine a sense of the number of dominant clusters in the channel, obtain a sense of the number of blockers in the environment, obtain robustness parameters, etc. UE characteristics may include data rate thresholds, download latency thresholds, upload latency thresholds, beam management overhead thresholds, power consumption thresholds, thermal thresholds, maximum permissible exposure thresholds, etc. (e.g., which may be based on an application running at the UE, thermal and/or power measurements at the UE, etc.).

The UE may then feedback, to the base station, MIMO operation information (e.g., at least a subset of the channel characteristics, at least a subset of the UE characteristics, or both) for MIMO operation mode configuration. In some cases, the MIMO operation information may include a requested beam management configuration (e.g., a request for one or more MIMO operation modes determined by the UE). The base station may receive the MIMO operation information and may determine one or more MIMO operation modes for the UE based on the received MIMO operation information. In some cases, the base station may determine one or more MIMO operation modes for the UE based on network conditions (e.g., based on a number of dominant clusters in a channel, a blockage condition associated with the channel, a network data rate threshold, a network latency threshold, a network beam management overhead threshold, a power consumption threshold, a thermal threshold, a maximum permissible exposure threshold, etc.). The base station may then transmit a MIMO operation mode configuration to the UE.

BRIEF DESCRIPTION OF THE DRAWINGS

FIGS. 4A, 4B, 4C, and 4D illustrate examples of devices that support dynamic switching between different MIMO operation modes in accordance with aspects of the present disclosure.

DETAILED DESCRIPTION

Figure 1:
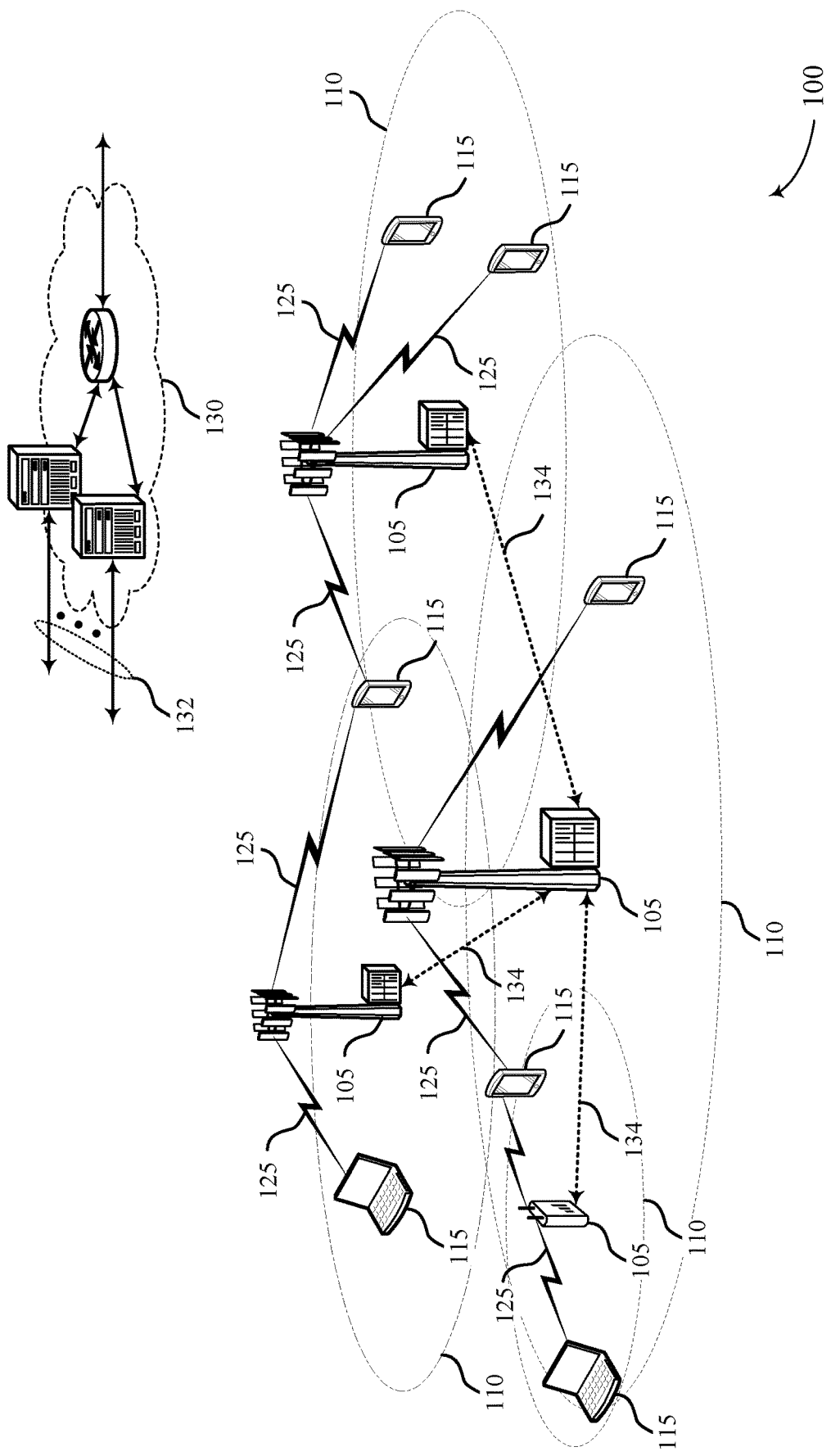
FIG. 1 illustrates an example of a system for wireless communications that supports dynamic switching between different multiple input multiple output (MIMO) operation modes in accordance with aspects of the present disclosure.

Some wireless communications systems may operate in millimeter wave (mmW) frequency ranges (e.g., 28 GHz, 39 GHz, 60 GHz, etc.). In some cases, wireless communication at these frequencies may be associated with increased signal attenuation (e.g., path loss), which may be influenced by various factors, such as diffraction. As a result, signal processing techniques such as beamforming (in particular, directional transmissions and receptions) may be used to coherently combine signal energy and overcome the path loss in specific beam directions. In some cases, a device may select an active beam for communicating with a network by selecting the strongest beam from among a number of candidate beams.

mmW wireless networks typically rely on beam management procedures to monitor the performance of active beams and identify candidate beams that can be utilized in the event the active beam becomes unavailable or otherwise unusable. Conventionally, the transmitting device (e.g., a base station and/or a user equipment (UE)) will configure a receiving device (e.g., a UE and/or base station) with a defined number of best beams to be reported in a beam measurement report. The transmitting device transmits beamformed signals in a sweeping manner around its coverage area and the receiving device measures the receive signal levels using one or more receive beams for each transmit beam. The receiving device transmits a beam measurement report to the transmitting device that identifies the defined number of best beams via beam indices, along with their corresponding measured received signal levels (e.g., gain or reference signal received power (RSRP) levels). The transmitting device uses this information when selecting the active beam for continued communications with the receiving device. It can also use these beams as fallback options in the case of blockage, or for creating multi-beams in two distinct directions for enhanced spectral efficiencies.

Another function may be performed in a mmW network which may include cluster identification. Broadly, a cluster may refer to a property of the wireless channel between the transmitting device and the receiving device. A "cluster" is a standard term in channel modeling and MIMO processing for distinct objects or surfaces (e.g., reflectors such as glass windows/panes, lamp posts, etc., diffraction objects such as building corners, foliage, etc.) within a channel environment that allow propagation from the transmitting device to the receiving device. For example, clusters within the wireless channel may impact the propagation path/characteristics of the beamformed signal in some manner, at least to some degree. For example, glass windows or other flat, reflective surfaces may reflect a beamformed transmission in the direction of the receiving device, which may create a cluster for the wireless channel. Cluster identification is an important function in determining the channel propagation characteristics (e.g., channel characteristics) in a mmW network.

In some examples, a device may operate according to a multiple input multiple output (MIMO) operation mode, such as a polarization MIMO operation mode or a spatial MIMO operation mode. For example, a UE 115-a may support 2 radio frequency (RF) chains (e.g., 2 RF chains for transmission (2Tx) or 2 RF chains for reception (2Rx)). The 2 RF chains may be utilized in a polarization MIMO operation mode such that a single directional beam is used over two orthogonal polarizations for a 2× rate increase. In other cases, the 2 RF chains may be utilized in a spatial MIMO operation mode such that two directional beams may be focused in different directions or on different clusters.

However, as wireless communications systems and devices become more advanced (e.g., as devices, such as UEs, support a higher number of RF chains, such as 4Tx/4Rx, 4Tx/8Rx, 8Tx/8Rx, etc.), conventional techniques for MIMO operation mode configuration may be deficient. That is, selection and configuration between MIMO operation modes (e.g., MIMO operation modes using polarization MIMO and/or spatial MIMO) may introduce more design complexity and cost considerations (e.g., as premium-tier UEs and medium/low-tier UEs may be differentiated in terms of capabilities, such as the number of RF chains and peak download or upload rates they support). Further, in terms of MIMO/analog precoding, beam management (e.g., latency, energy) considerations, thermal considerations, power consumption considerations, etc. may arise.

Beneficially, UEs with increased RF capabilities (e.g., UEs supporting 4Tx/4Rx, 4Tx/8Rx, 8Tx/8Rx, etc.) may realize improved wireless communications performance (e.g., rate increase, robustness via beam switching/multi-beam operations across different antenna modules, etc.). Polarization MIMO may not fully utilize the RF capabilities in this case as there are only 2 orthogonal polarizations. With at least 2 RF chains (and even with 2 RF chains), a combination of polarization and spatial MIMO becomes possible (e.g., MIMO operation modes may be configurable that include polarization MIMO, spatial MIMO, or combinations thereof). The described techniques may provide for efficient dynamic switching between various MIMO operation modes. Further, the described techniques may provide for efficient UE indication (e.g., signaling) of support of various MIMO operation modes (e.g., efficient UE indication to a base station of support of various different MIMO modes of operation, of performance metrics associated with different MIMO modes of operation, of thermal and power consumption ramifications associated with different MIMO modes of operation, etc.).

For example, conventional techniques may include the UE reporting beam indices and RSRP levels to be used by the base station (e.g., in a beam measurement report). The base station may accept the beam measurement report and use the indicated beam indices and associated RSRP levels. Broadly, aspects of the described techniques provide a mechanism by which a UE may convey additional information (e.g., for one or more antenna modules of the UE, associated power metrics, thermal metrics, MIMO operation modes associated with the single or multiple transmission configuration indicator (TCI) states, etc.), such that the base station may efficiently configure the UE with various MIMO operation modes (e.g., via TCI state configuration). As such, UEs with increased RF chain capabilities may be configured to operate according to various MIMO operation modes (e.g., according to application needs, rate optimizations, UE power optimizations, UE thermal optimizations, etc.).

Aspects of the disclosure are initially described in the context of a wireless communications system. Example devices operating according to different MIMO operation modes, example process flows implementing the discussed techniques, and example device architecture are then described. Aspects of the disclosure are further illustrated by and described with reference to apparatus diagrams, system diagrams, and flowcharts that relate to dynamic switching between different MIMO operation modes.

FIG. 1 illustrates an example of a wireless communications system 100 that supports dynamic switching between different MIMO operation modes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or may be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 Megahertz (MHz) to 300 Gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multi-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunications system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Generally, wireless communications system 100 may support MIMO operation mode configuration (e.g., configuration of spatial MIMO, polarization MIMO, or both, across one or more antenna modules of a UE 115) based on the UE characteristics, channel characteristics, or both. For example, a base station 105 and a UE 115 may perform a beam training procedure, and the UE 115 may determine channel characteristics, as well as UE characteristics, for MIMO operation mode configuration. Channel characteristics may include RSRP measurements associated with some set of beam indices, dominant clusters in a channel, blockage conditions at the UE 115, robustness thresholds, etc.

For example, during a beam training procedure, a set of beam indices (e.g., some top K beam indices) may be identified by a UE 115. Based on RSRP measurements associated with the set of beam indices, the UE 115 may determine a sense of the number of dominant clusters in the channel, obtain a sense of the number of blockers in the environment, obtain robustness parameters, etc. UE characteristics may include data rate thresholds, download latency thresholds, upload latency thresholds, beam management overhead thresholds, power consumption thresholds, thermal thresholds, maximum permissible exposure thresholds, etc. (e.g., which may be based on an application running at the UE 115, thermal and/or power measurements at the UE 115, etc.).

The UE 115 may then feedback, to the base station 105, MIMO operation information (e.g., at least a subset of the channel characteristics, at least a subset of the UE characteristics, or both) for MIMO operation mode configuration. In some cases, the MIMO operation information may include a requested beam management configuration (e.g., a request for one or more MIMO operation modes determined by the UE 115). The base station 105 may receive the MIMO operation information, and may determine one or more MIMO operation modes for the UE 115 based on the received MIMO operation information. In some cases, the base station 105 may determine one or more MIMO operation modes for the UE 115 based on network conditions (e.g., based on a number of dominant clusters in a channel, a blockage condition associated with the channel, a network data rate threshold, a network latency threshold, a network beam management overhead threshold, a power consumption threshold, a thermal threshold, a maximum permissible exposure threshold, etc.). The base station 105 may then transmit a MIMO operation mode configuration to the UE 115.

Figure 2:
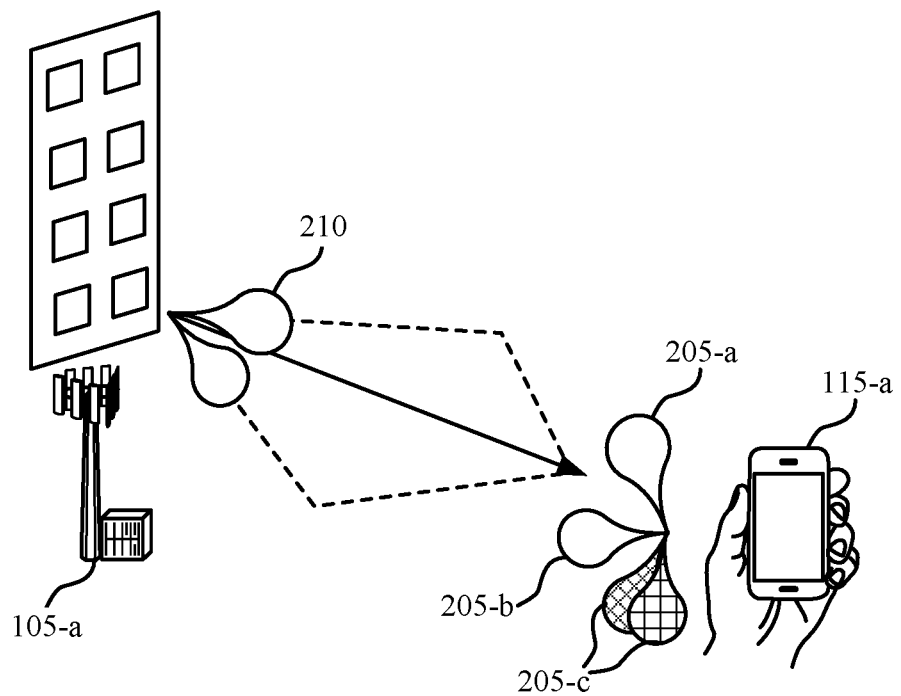
FIG. 2 illustrates an example of a wireless communications system that supports dynamic switching between different MIMO operation modes in accordance with aspects of the present disclosure.

FIG. 2 illustrates an example of a wireless communications system 200 that supports dynamic switching between different MIMO operation modes in accordance with aspects of the present disclosure. In some examples, wireless communications system 200 may implement aspects of wireless communications system 100. For example, aspects of wireless communications system 200 may be implemented by a base station 105-*a* and a UE 115-*a*, which may be examples of a base station 105 and a UE 115, as described herein.

Generally, a transmitting device (e.g., a base station 105-*a* for downlink transmission or a UE 115-*a* for uplink transmissions) and the receiving device (e.g., a base station 105-*a* for uplink transmission or a UE 115-*a* for downlink transmissions) may be configured to perform wireless communications in a mmW network. For example, a transmitting device may have a transmitter array that comprises a plurality of antenna elements that are used by the transmitting device to configure a beamformed signal for wireless transmission to a receiving device. Similarly, a receiving device may have a receiver array that comprises a plurality of antenna elements that are used by the receiving device to receive a signal from a transmitting device in a directional manner. In some cases, a transmitter array may also be used for beamformed reception and the receiver array may be used for transmitting beamformed signals (e.g., a transmitter array and a receiver array may be a same array of antenna elements, or may be different arrays of antenna elements). For example, a transmitting device and a receiving device may utilize digital and/or analog techniques to control one or more of the antenna elements in order to perform wireless communications using beamformed signals. Generally, a transmitting device and/or receiving device may utilize such beamforming techniques in a mmW network for access traffic and/or backhaul traffic (e.g., such as an integrated access and backhaul (IAB) network).

In some examples, a device may operate according to a MIMO operation mode, such as a polarization MIMO operation mode or a spatial MIMO operation mode. For example, a UE 115-*a* may support 2 RF chains (e.g., 2 RF chains for transmission (2Tx) or 2 RF chains for reception (2Rx)). The 2 RF chains may be utilized in a polarization MIMO operation mode such that a single directional beam 205-*c* is used over two orthogonal polarizations for a 2× rate increase. In other cases, the 2 RF chains may be utilized in a spatial MIMO operation mode such that two directional beams (e.g., beam 205-*a* and beam 205-*b*) may be focused in different directions or on different clusters.

However, as wireless communications systems and devices become more advanced (e.g., as devices, such as UE, support a higher number of RF chains, such as 4Tx/4Rx, 4Tx/8Rx, 8Tx/8Rx, etc.), conventional techniques for MIMO operation mode configuration may be deficient. That is, selection and configuration between MIMO operation modes (e.g., MIMO operation modes using polarization MIMO and/or spatial MIMO) may introduce more design complexity and cost considerations (e.g., as premium-tier UEs and medium/low-tier UEs may be differentiated in terms of capabilities, such as the number of RF chains they support). Further, in terms of MIMO/analog precoding, beam management (e.g., latency, energy) considerations, thermal considerations, power consumption considerations, etc. may arise. In some cases, some mmW architectures may support antennas across multiple logical ports (e.g., but only one "true" polarization in the intended direction(s) of coverage).

Beneficially, UEs with increased RF capabilities (e.g., premium tier UEs, such as UEs supporting 4Tx/4Rx, 4Tx/8Rx, 8Tx/8Rx, etc.) may realize improved wireless communications performance (e.g., such as rate increase, robustness via beam switching/multi-beam operations across different antenna modules, etc.). Polarization MIMO may not fully utilize the RF capabilities in this case as there are only 2 orthogonal polarizations. With at least 2 RF chains (and even with 2 RF chains), a combination of polarization and spatial MIMO becomes possible. The described techniques may provide for efficient dynamic switching between various MIMO operation modes. Further, the described techniques may provide for efficient UE indication (e.g., signaling) of support of various MIMO operation modes (e.g., efficient UE indication to a base station of support of various different MIMO modes of operation).

For example, a base station 105-*a* may perform beam training for a UE 115-*a*, and the UE 115-*a* may determine best beam indices at its end. From the top K beam indices (e.g., which may be used to determine angle of arrivals) and the associated signal strengths (e.g., reference signal received power (RSRP)), UE 115-*a* may obtain a measure or sense of the number of dominant clusters in the channel. The UE 115-*a* may also obtain a sense of the number of blockers in its environment and the associated robustness needs. The UE 115-*a* may then determine one or more MIMO operation modes (e.g., whether polarization MIMO and/or spatial MIMO makes sense, and when they make sense) based on the UE 115-*a*'s rate and robustness requirements, tolerable beam management/data download latencies (e.g., depending on the application used by the UE 115-*a*), power and thermal metrics (e.g., using thermal and power consumption sensors), channel sense metrics (e.g., based on signal strength and blocker measurements), etc. In some cases, spatial MIMO or polarization MIMO may be implemented by specific antenna array architectures. Based on the UE determination (e.g., UE 115-*c* determination of various MIMO operation modes and when they make sense to be used by the UE 115-*c*), the UE may indicate or request support at the base station for beam management (e.g., the UE may indicate which TCI states to use and across which bands).

The UE 115-*a* may signal or feedback (e.g., to the base station or transmission reception points (TRPs)) which beam indices are intended for which antenna modules/panels, the associated power or thermal metrics, the associated MIMO operation mode (e.g., spatial MIMO and/or polarization MIMO), etc. The receiving base station may thus use the UE feedback along with its own sense of the network to schedule appropriate MIMO operation modes for the UE 115-*a*. That is, a UE 115-*a* may indicate, to base station 105-*a*, a request for support for a single or multiple TCI states depending on the satisfaction of various conditions at the UE 115-*a*. The UE 115-*a* may indicate, for one or more antenna modules of the UE, associated power metrics, thermal metrics, MIMO operation modes associated with the single or multiple TCI states, etc. (e.g., as further described herein, for example, with reference to FIG. 4).

In some aspects, due to the sparsity of channels and the use of larger antenna arrays (e.g., a larger number of antenna elements), beamforming in a mmW network may be more directional than in sub-6 GHz systems. In some cases, this may lead to signaling happening over distinct clusters in the wireless channel. Broadly, clusters may have multiple paths over a narrow/wide angular spread. Depending on the environment, there may be small (e.g., 1-2) or a large (e.g., 5-7) number of clusters in the channel. Generally, beamforming and/or beam management techniques in a mmW network may include the identification of distinct clusters. For example, clusters may be distinct (e.g., spatially separated) and therefore can be used for diversity or beam switching in a single-user system (e.g., to overcome blockage) and/or for well-separated (e.g., low-interference) multi-user beam designs. As another example, the multi-beams or multiplexing over a single RF chain may be created by co-phasing beams across distinct clusters and/or beamforming may be performed over multiple RF chains with distinct clusters (e.g., spatial MIMO).

Generally, beam management includes the transmitting device transmitting and the receiving device scanning using a codebook of a fixed size. The receiving device determines the RSRP estimates for all beam pairs to form an RSRP table. In some examples, the receiving device may average RSRP values over multiple sub-bands and/or multiple symbols for SNR enhancement. Broadly, each entry in the RSRP table may correspond to an RSRP value obtained by the receiving device that corresponds to a particular beam pair. The beam pairing may refer to the transmit beam index from the transmitting device and the receive beam index of the receiving device used to determine the RSRP value. The receiving device creates the RSRP table and identifies the best beams (e.g., the highest RSRP or gain values) to be included in a beam measurement report transmitted to the transmitting device. For each included RSRP value in the measurement report, the receiving device includes the corresponding transmit beam index of the transmitting device which is known as the TCI state, e.g., the transmitting device may be unaware of which receive beam of the receiving device was used to obtain the RSRP value. In some aspects, the transmitting device may configure or otherwise inform the receiving device of how many best beams to report and the beam measurement report, e.g., by signaling or configuring the receiving device to include K best beams in the measurement report.

For example, conventional techniques may include the UE reporting beam indices and reference signal received power (RSRP) levels to be used by the base station (e.g., in a beam measurement report). The base station may accept the beam measurement report and uses the indicated beam indices and associated RSRP levels. Broadly, aspects of the described techniques provide a mechanism by which a UE (e.g., UE 115-a) may convey additional information (e.g., for one or more antenna modules of the UE, associated power metrics, thermal metrics, MIMO operation modes associated with the single or multiple TCI states), such that the base station may efficiently configure the UE with various MIMO operation modes (e.g., via TCI state configuration). As such, UEs with increased RF chain capabilities may be configured to operate according to various MIMO operation modes (e.g., according to application needs, rate optimizations, power optimizations, thermal optimizations).

Different configurations of polarization MIMO and spatial MIMO (e.g., different MIMO operation modes) may offer different trade-offs and advantages in different scenarios or UE conditions. For example, polarization MIMO may provide for improved functionality (e.g., more efficient communications) under low channel rank conditions when there are relatively fewer dominant clusters (e.g., as polarization MIMO may allow for the use of 2 polarizations across multiple bands for higher rate gain, such as 2× gain per direction and 2× gains over two distinct bands such as 28 GHz and 39 GHz, for example). Further, polarization MIMO may be implemented for higher rate requirements (e.g., which may depend on application). In some cases, polarization MIMO may be implemented to reduce power consumption at the UE, as polarization MIMO may excite a single or smaller number of antenna modules and associated radio frequency integrated circuits (e.g., there may be a lesser number of active components at the RF level in this scenario). In some cases, polarization MIMO may be implemented to reduce beam management overhead (e.g., latency, channel state information (CSI) overhead, etc.) since a lesser number of beams may be maintained at base station/UE sides for polarization MIMO.

On the other hand, spatial MIMO may provide for more robustness to beam blockage (e.g., blockage by a user's hand, body, etc.), may provide for reduced thermal gradient at the UE since the RF power is concentrated over multiple antenna modules and their associated radio frequency integrated circuits which are located at geographically different locations, etc. For example, spatial MIMO may be implemented when there is a relatively larger number of dominant clusters in the channel, when there are lower rate requirements, to reduce the temperature or thermal gradient at the UE, to increase robustness to beam blockage (e.g., as spatial MIMO corresponds to multi-beam operation), etc. In some cases, spatial MIMO may be associated with increased beam management (e.g., an increased number of beams may be maintained, which may result in additional signaling overhead). Spatial MIMO may be associated with increased power consumption at the RF level (e.g., compared to polarization MIMO), as spatial MIMO may typically use multiple antenna modules. Depending on the specific antenna array architecture, spatial MIMO or polarization MIMO may be necessitated preferentially.

Figure 3A:
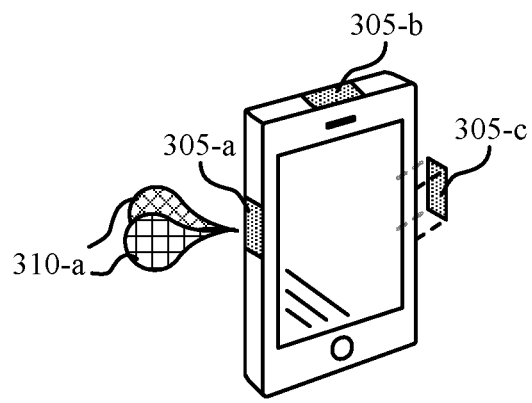
FIGS. 3A and 3B illustrate examples of devices that support dynamic switching between different MIMO operation modes in accordance with aspects of the present disclosure.

FIG. 3A illustrates an example of a device 300 that supports dynamic switching between different MIMO operation modes in accordance with aspects of the present disclosure. In some examples, device 300 may implement aspects of wireless communications systems 100 and/or 200. For example, device 300 may be an example of a UE 115, as described herein. Device 300 may illustrate an example of a multi-radio frequency front end (RFFE) UE. In the present example, device 300 may include three modules (e.g., module 305-a, module 305-b, and module 305-c), and the modules may be located on three edges of the device. Each module 305 (e.g., which in some cases may be referred to as an antenna module) may be controlled by a radio frequency integrated circuit (RFIC), and RF chains may be switched across different RFICs. Further, each module may be equipped with antennas across different bands (e.g., and may share RF chains across bands, such as 28, 39, 42, 73, 95+ etc.).

Generally, a device may (e.g., based on capabilities of the device) support some number of layers in some i-th module ($R_i$), some number of RF chains in the i-th module ($L_i$), and some total number of RF chains (L). For example, a device may support some total number of RF chains (e.g., L=2, 4, 8, etc.), and the L RF chains may be switched across different RFICs such that no more than $L_i$ RF chains are configured for an i-th module of the device. The higher the $L_i$ or L, the more cost, power consumption, complexity, etc.

In some cases, a constraint may exist on how many layers may be sent per module (e.g., $R_i \leq L_i \leq S \leq L$ and $\Sigma R_i \leq L$, where S is the number of streams). Such a constraint may limit cost, power consumption, thermal overshoot, etc. and may simplify circuit design complexity as RF chains may be shared across modules. Further, such a constraint may use dominant and sub-dominant clusters for transmission, reception, or both. In other cases, such a constraint on how many layers may be sent per module may not exist (e.g., $R_i \leq L_i$ and $\Sigma R_i \leq L$). In cases where there is no such constraint, improved performance may be realized as spatial MIMO and polarization MIMO may be possible within a given module (e.g., within some i-th module), however this may be associated with increased cost and complexity.

For a few examples, if S=L=2, polarization MIMO may correspond to the use of 2 polarizations within a module across a given band. If S=L=4, polarization MIMO may correspond to the use of 2 polarizations across 2 bands (e.g., 28 GHz and 39 GHz via inter-band carrier aggregation) within a module. If S=2 and L=4, spatial MIMO may correspond to the use of 2 polarizations across one or more bands across 2 modules, or the use of 2 polarizations across one band in 1 module and spatial MIMO across 1 or 2 modules across 1 or more bands. If S=2 and L=4, spatial MIMO may correspond to the use of 1 or 2 polarizations across one or more bands in different directions across multiple modules.

The example of FIG. 3A may illustrate a device 300 implementing polarization MIMO in some Module 1, illustrated by module 305-a (e.g., here S=L=2, $R_1$=2, and $R_2=R_3=0$, where Module 2 and Module 3 are illustrated by module 305-*b* and module 305-*c*, respectively). For example, device 300 may implement rank-2 polarization MIMO within module 305-*a*, which may allow for the use of a same directional beam 310-*a* (e.g., same beam weights) over two polarizations of the same antenna module 305-*a* (e.g., which may increase rates).

Figure 3B:
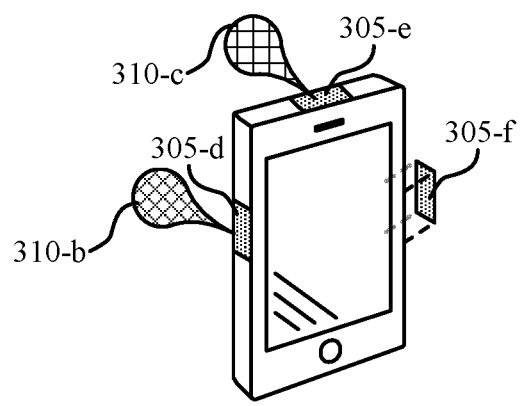

FIG. 3B illustrates an example of a device 301 that supports dynamic switching between different MIMO operation modes in accordance with aspects of the present disclosure. In some examples, device 301 may implement aspects of wireless communications systems 100 and/or 200. For example, device 301 may be an example of a UE 115, as described herein. Device 301 may illustrate an example of a multi-RFFE UE. In the present example, device 301 may include three modules (e.g., module 305-*d*, module 305-*e*, and module 305-*f*), and the modules may be located on three edges of the device. Each module 305 (e.g., which in some cases may be referred to as an antenna module) may be controlled by a RFIC, and RF chains may be switched across different RFICs. Further, each module may be equipped antennas across different bands (e.g., and may share RF chains across bands, such as 28, 39, 42, 73, 95+ etc.).

The example of FIG. 3B may illustrate a device 301 implementing spatial MIMO in a Module 1 and a Module 2, illustrated by module 305-*d* and module 305-*e*, respectively (e.g., here S=L=2, $R_1=R_2=1$, and $R_3=0$, where Module 3 is illustrated by module 305-*f*). For example, device 301 may implement rank-2 spatial MIMO and may use different beam weights (e.g., different directional beams) over the same, or different, polarizations of different antenna modules (e.g., over module 305-*d* and module 305-*e* in the present example) for rate improvement. In general, spatial MIMO may be of any rank (e.g., up to the capabilities of the device).

FIG. 4A illustrates an example of a device 400 that supports dynamic switching between different MIMO operation modes in accordance with aspects of the present disclosure. In some examples, device 400 may implement aspects of wireless communications systems 100 and/or 200. For example, device 400 may be an example of a UE 115, as described herein. Device 400 may illustrate an example of a multi-RFFE UE. In the present example, device 400 may include three modules (e.g., module 405-*a*, module 405-*b*, and module 405-*c*), and the modules may be located on three edges of the device. Each module 405 (which in some cases may be referred to as an antenna module) may be controlled by a RFIC, and RF chains may be switched across different RFICs. Further, each module may be equipped antennas across different bands (e.g., and may share RF chains across bands, such as 28, 39, 42, 73, 95+ etc.).

The example of FIG. 4A may illustrate a device 400 implementing polarization MIMO across one or more bands in Module 1 and a Module 3, illustrated by module 405-*a* and module 405-*c*, respectively (e.g., here S=2, L=4, $R_1=R_3=2$, and $R_2=0$, where Module 2 is illustrated by module 405-*b*). For example, device 400 may implement rank-2 polarization MIMO within module 405-*a*, which may allow for the use of a same directional beam 410-*a* (e.g., same beam weights) over two polarizations of the same antenna module 405-*a* (e.g., which may increase rates). Further, device 400 may implement rank-2 polarization MIMO within module 405-*c*, which may allow for the use of a same directional beam 410-*b* (e.g., same beam weights) over two polarizations of the same antenna module 405-*c* (e.g., which may further increase rates). In the example of FIG. 4A, S=2 and L=4. As such, a maximum of 2 beams/RF chains per module is supported (e.g., and a device 400 may implement polarization MIMO across two modules, as the device 400 supports L=4 RF chains).

FIG. 4B illustrates an example of a device 401 that supports dynamic switching between different MIMO operation modes in accordance with aspects of the present disclosure. In some examples, device 401 may implement aspects of wireless communications systems 100 and/or 200. For example, device 401 may be an example of a UE 115, as described herein. Device 401 may illustrate an example of a multi-RFFE UE. In the present example, device 401 may include three modules (e.g., module 405-*d*, module 405-*e*, and module 405-*f*), and the modules may be located on three edges of the device. Each module 405 (e.g., which in some cases may be referred to as an antenna module) may be controlled by a RFIC, and RF chains may be switched across different RFICs. Further, each module may be equipped antennas across different bands (e.g., and may share RF chains across bands, such as 28, 39, 42, 73, 95+ etc.).

The example of FIG. 4B may illustrate a device 401 implementing polarization MIMO across one or more bands in Module 1, illustrated by module 405-*d*. Further, device 401 may implement spatial MIMO in Module 2 and a Module 3, illustrated by module 405-*e* and module 405-*f*, respectively (e.g., here S=2, L=4, $R_1=2$, and $R_2=R_3=0$). For example, device 401 may implement rank-2 polarization MIMO within module 405-*d*, which may allow for the use of a same directional beam 410-*c* (e.g., same beam weights) over two polarizations of the same antenna module 405-*d* (e.g., which may increase rates). Further, device 401 may implement spatial MIMO (e.g., rank-1) within module 405-*e* and spatial MIMO within module 405-*f*, which may allow for the use of a directional beam 410-*d* (e.g., via module 405-*e*) and directional beam 410-*e* (e.g., via module 405-*f*). In the example of FIG. 4B, S=2 and L=4. As such, in general, a maximum of 2 beams/RF chains per module is supported (e.g., and a device 401 may implement polarization MIMO across one module and spatial MIMO across two modules, as the device 401 supports L=4 RF chains).

As discussed herein, a UE (e.g., such as a device 401) may indicate MIMO operation information to a base station for MIMO operation mode configuration. In some cases, MIMO operation information may indicate, to the base station 105-*b*, a need for support for a single or multiple TCI states depending on the satisfaction of certain conditions at the UE. The MIMO operation information may indicate, to the base station 105-*b*, antenna modules or panels, associated power or thermal metrics, MIMO operation modes (e.g., spatial or polarization MIMO) associated with the one or more TCI states, etc. As discussed herein, conditions (or criteria) may include determination of the number of dominant clusters in the channel, determination of the blockage conditions and a need for robustness of transmissions or receptions, determination of a higher rate requirement based on application used, determination of the power consumption at the UE, determination of the thermal conditions at the UE, determination of the latency requirements of beam management and application at the UE, determination based on the antenna array architecture at the UE, etc. For example, a device 401 may convey (e.g., via MIMO operation information in UE feedback) all or some subset of information shown in example Table 1.

TABLE 1

| TCI States | Module Number | Rate | Power | Thermal |
| --- | --- | --- | --- | --- |
| {0, 1} | 1 | Medium | Low | High |
| {0, 2} or {1, 2} | 1, 2 | Low | Medium | Low |
| {0, 3} or {1, 3} | 1, 3 | Low | Medium | Low |
| {2, 3} | 2, 3 | Low | Medium | Low |
| {0, 1, 2} | 1, 2 | Higher | High | Higher |
| {0, 1, 3} | 1, 3 | Higher | High | Higher |
| {0, 2, 3} or {1, 2, 3} | 1, 2, 3 | High | Higher | Medium |
| {0, 1, 2, 3} | 1, 2, 3 | Highest | Highest | Highest |

Table 1 may show an example of information a device 401 may indicate to a base station. Based on some or all of information received in MIMO operation information, a base station may configure the device 401 to operate according to various MIMO operation modes. For example, a base station may indicate a TCI state {0, 1, 2, 3} in scenarios or conditions requiring high throughput (e.g., based on application requirements, relatively favorable channel conditions, etc.). TCI state {0, 1, 2, 3} may be associated with relatively high data rates, power consumption, and thermal conditions at the UE (e.g., as Modules 1, 2, and 3, illustrated by module 405-d, module 405-e, and module 405-f, may be actively implementing MIMO operations). In other examples, a base station may indicate a TCI state {0, 2} or {1, 2} to reduce thermal conditions at a UE, etc. In some cases, indication for support of a single TCI state may correspond to polarization MIMO within a module or across multiple bands within a module. Indication for support of multiple TCI states may correspond to the use of a combination of polarization and spatial MIMO across different directions within multiple modules across one or more bands.

Generally, a UE or device may signal some MIMO operation information (e.g., which may include any or all of the example MIMO operation information described herein) to a base station. A base station may then select choices of TCI states for the application based on the feedback (e.g., based on the received MIMO operation information). The base station may select choices of TCI states to optimize rate, power considerations, thermal considerations, etc. (e.g., or to optimize some combination of optimize rate, power considerations, thermal considerations, etc.).

FIG. 4C illustrates an example of a device 402 that supports dynamic switching between different MIMO operation modes in accordance with aspects of the present disclosure. In some examples, device 402 may implement aspects of wireless communications systems 100 and/or 200. For example, device 402 may be an example of a UE 115, as described herein. Device 402 may illustrate an example of a multi-RFFE UE. In the present example, device 402 may include three modules (e.g., module 405-g, module 405-h, and module 405-i), and the modules may be located on three edges of the device. Each module 405 (e.g., which in some cases may be referred to as an antenna module) may be controlled by a RFIC, and RF chains may be switched across different RFICs. Further, each module may be equipped antennas across different bands (e.g., and may share RF chains across bands, such as 24, 26, 28, 39, 42, 73, 95+ GHz, etc.).

The example of FIG. 4C may illustrate a device 402 implementing spatial MIMO across modules. Specifically, the present example illustrates a device 402 implementing rank-2 spatial MIMO in Module 1, illustrated by module 405-g. Further, device 402 may implement rank-1 spatial MIMO in each of Module 2 and Module 3, illustrated by module 405-h and module 405-i, respectively (e.g., here S=2, L=4, $R_1$=2, and $R_2$=$R_3$=1). For example, device 402 may implement rank-2 spatial MIMO within module 405-g, which may allow for the use of a directional beam 410-f and a directional beam 410-g via antenna module 405-g. Further, device 402 may implement rank-1 spatial MIMO within each of module 405-h and module 405-i, which may allow for the use of a directional beam 410-h (e.g., via module 405-h) and directional beam 410-i (e.g., via module 405-i). In the example of FIG. 4C, S=2 and L=4. As such, in general, a maximum of 2 beams/RF chains per module is supported (e.g., and a device 402 may implement rank-2 spatial MIMO across two modules, rank-2 spatial MIMO across one module and rank-1 spatial MIMO across two modules, rank-2 spatial MIMO across one module and rank-1 spatial MIMO across one module, rank-1 spatial MIMO across three modules, etc., as the device 402 supports L=4 RF chains).

FIG. 4D illustrates an example of a device 403 that supports dynamic switching between different MIMO operation modes in accordance with aspects of the present disclosure. In some examples, device 403 may implement aspects of wireless communications systems 100 and/or 200. For example, device 403 may be an example of a UE 115, as described herein. Device 403 may illustrate an example of a multi-RFFE UE. In the present example, device 403 may include three modules (e.g., module 405-j, module 405-k, and module 405-l), and the modules may be located on three edges of the device. Each module 405 (which in some cases may be referred to as an antenna module) may be controlled by a RFIC, and RF chains may be switched across different RFICs. Further, each module may be equipped antennas across different bands (and may share RF chains across bands, such as 28, 39, 42, 73, 95+ etc.).

The example of FIG. 4D may illustrate a device 403 implementing inter-band carrier aggregation polarization MIMO. Specifically, the present example illustrates a device 403 implementing polarization MIMO across multiple bands in Module 1, illustrated by module 405-j (e.g., here S=4, L=4, $R_1$=2, and $R_2$=$R_3$=1, where Module 2 and Module 3 are illustrated by module 405-k and module 405-l, respectively). For example, device 403 may implement rank-2 polarization MIMO within module 405-k across some first band, which may allow for the use of a same directional beam 410-j (e.g., same beam weights) over two polarizations of the same antenna module 405-j (e.g., which may increase rates over a first band). Further, device 403 may implement rank-2 polarization MIMO within module 405-k across some second band, which may allow for the use of a same directional beam 410-k (e.g., same beam weights) over two polarizations of the same antenna module 405-j (e.g., which may increase rates over a second band). In the example of FIG. 4C, S=4 and L=4. As such, in general, a maximum of 4 beams/RF chains per module is supported (e.g., and a device 403 may implement polarization MIMO across two bands via one module, polarization MIMO via two modules, rank-4 spatial MIMO via one module, rank-2 spatial MIMO via two modules, etc., as the device 403 supports L=4 RF chains).

The example MIMO operation mode implementations by the example devices illustrated in FIGS. 3 and 4 are shown for illustrative purposes. Various other MIMO operation modes (e.g., depending on device capability) are contemplated by analogy, without departing from the scope of the present disclosure. As discussed herein, a UE may be configured with various MIMO operation modes (e.g., such as the MIMO operation modes exemplified in FIGS. 3 and 4, as well as other MIMO operation modes) based on UE characteristics, channel characteristics, etc. For example, in some cases, device 403 may be associated with a higher thermal gradient than, for example, device 402 (e.g., device 402 may be associated with relatively more thermal dispersion across antenna modules). In some cases, device 403 may provide for higher rates (e.g., data rates) than, for example, device 301. In some cases, device 402 may provide for more robustness (e.g., in scenarios with relatively adverse channel characteristics) than device 403. As such, a device may generally be configured with various MIMO operation modes based on UE characteristics, channel characteristics, etc., as discussed herein.

Figure 5A:
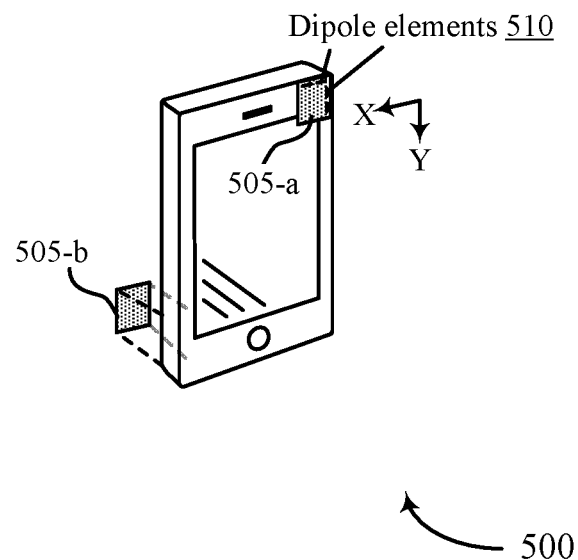
FIGS. 5A and 5B illustrate examples of devices that support dynamic switching between different MIMO operation modes in accordance with aspects of the present disclosure.

FIG. 5A illustrates an example of a device 500 that supports dynamic switching between different MIMO operation modes in accordance with aspects of the present disclosure. In some examples, device 500 may implement aspects of wireless communications systems 100 and/or 200. For example, device 500 may be an example of a UE 115, as described herein. Device 500 may illustrate an example of a multi-RFFE UE. In the present example, device 500 may include two modules (e.g., module 505-*a* and module 505-*b*), and the modules 505 may be located on two edges (e.g., or two corners) of the device. Each module 505 (e.g., which in some cases may be referred to as an antenna module) may be controlled by a RFIC, and RF chains may be switched across different RFICs. Further, each module 505 may be equipped antennas across different bands (e.g., and may share RF chains across bands, such as 28, 39, 42, 73, 95+ etc.).

The example of FIG. 5A may illustrate a device 500 with modules 505 each including dipole elements 510 ordered in a 2×2 configuration. For example, each module 505 of device 500 may include two dipole elements 510 on the x-axis of the module 505 (e.g., a Dipole X) and two dipole elements 510 on the y-axis of the module 505 (e.g., a Dipole Y). Dipole X and Dipole Y may be combined on two spatial MIMO layers due to architectural constraints (e.g., the device 500 may combine Dipole X and Dipole Y on two spatial MIMO layers due to antenna array architecture description for the antenna modules 505 at the device 500).

Figure 5B:
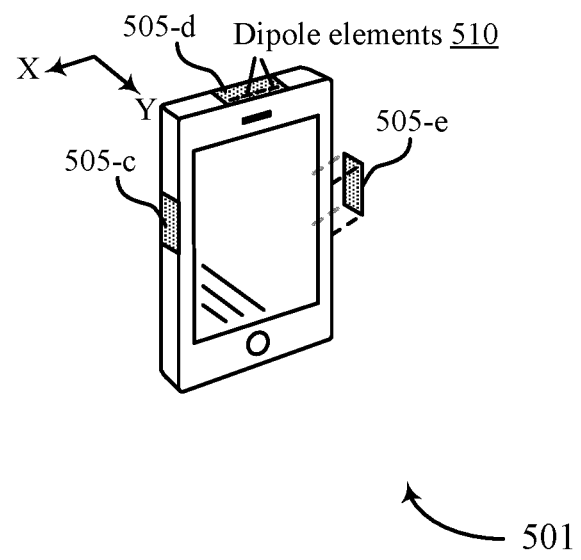

FIG. 5B illustrates an example of a device 501 that supports dynamic switching between different MIMO operation modes in accordance with aspects of the present disclosure. In some examples, device 501 may implement aspects of wireless communications systems 100 and/or 200. For example, device 501 may be an example of a UE 115 (e.g., as well as a device 300, device 301, device 400, device 401, device 402, and/or device 403), as described herein. Device 501 may illustrate an example of a multi-RFFE UE. In the present example, device 501 may include three modules (e.g., module 505-*c*, module 505-*d*, and module 505-*e*), and the modules 505 may be located on three edges of the device. Each module 505 (which in some cases may be referred to as an antenna module) may be controlled by a RFIC, and RF chains may be switched across different RFICs. Further, each module 505 may be equipped with antennas across different bands (e.g., and may share RF chains across bands, such as 28, 39, 42, 73, 95+ etc.).

The example of FIG. 5B may illustrate a device 501 with modules 505 each including dipole elements 510 ordered in a 4×1 configuration. For example, each module 505 of device 501 may include four dipole elements 510 on the x-axis of the module. That is, device 501 may include a four-element dipole on top of module 505-*d*. These four dipole elements may be fed by two independent ports due to architectural constraints (e.g. but are truly in the same polarization in the intended direction(s) of coverage). The architectural constraints may include the differentially fed nature of a dipole antenna which may consume two antenna feeds (instead of one for a non-differentially fed choice) and hence these four antennas may be connected via two independent ports. The four dipole elements may be combined via spatial MIMO (e.g., but may effectively become polarization MIMO).

The example antenna array architecture descriptions for the antenna modules of the example devices illustrated in FIG. 5 are shown for illustrative purposes. Various other antenna array architecture descriptions for device antenna modules (e.g., depending on device capability, device manufacturer, etc.) are contemplated by analogy, without departing from the scope of the present disclosure. As discussed herein, a UE may be configured with various MIMO operation modes (e.g., such as the MIMO operation modes exemplified in FIGS. 3 and 4, as well as other MIMO operation modes) based on UE characteristics, channel characteristics, etc. In some cases, such may include a UE being configured with a MIMO operation mode based at least in part on an antenna array architecture for one or more of the antenna modules of the UE (e.g., a device 500 may not be configured with MIMO operation modes utilizing more than 2 spatial MIMO layers, due to the antenna array architecture for one or more of the antenna modules 505 of the device 500).

Figure 6:
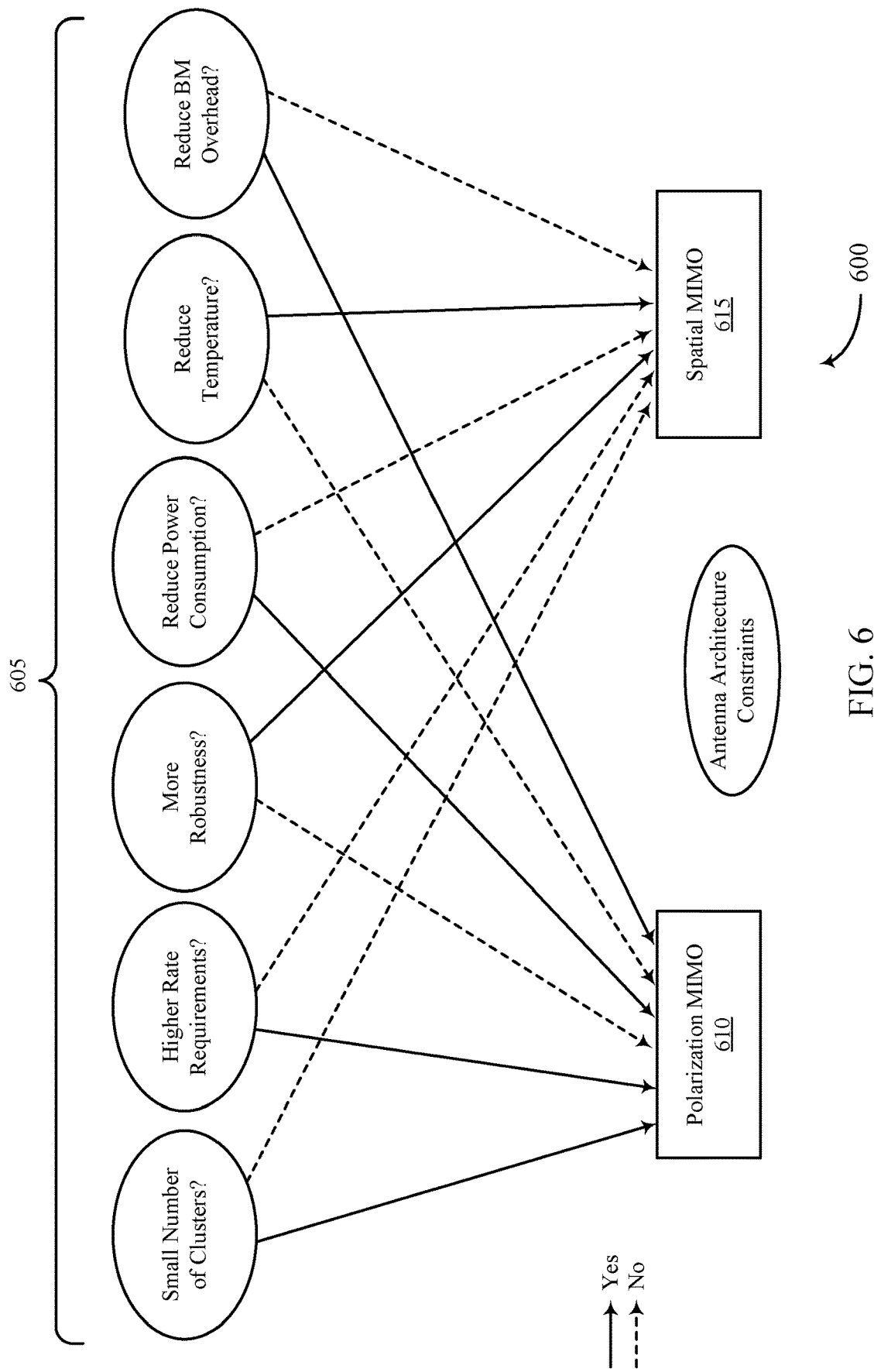
FIG. 6 illustrates an example of a decision flow chart that supports dynamic switching between different MIMO operation modes in accordance with aspects of the present disclosure.

FIG. 6 illustrates an example of a decision flow chart 600 that supports dynamic switching between different MIMO operation modes in accordance with aspects of the present disclosure. In some examples, decision flow chart 600 may implement aspects of wireless communications system 100 and/or wireless communications system 200. For example, a base station 105 and/or a UE 115 (e.g., and/or a device, as described herein), may implement aspects illustrated by decision flow chart 600. Decision flow chart 600 may illustrate how various criteria 605 may be taken into account for determination of polarization MIMO 610 and/or spatial MIMO 615 that may be implemented as at least some part of a MIMO operation mode.

For example, a base station 105 may implement aspects of decision flow chart 600 for MIMO operation mode configuration of a UE 115. Additionally or alternatively, a UE 115 may implement aspects of decision flow chart 600 for determining a MIMO operation mode and requesting a beam management configuration (e.g., according to the determined MIMO operation mode). In some examples, some or all of the criteria 605 information may be included in UE feedback to a base station 105 (e.g., some of the criteria 605 information may be included in the UE indication of at least a subset of the channel characteristics, at least a subset of the UE characteristics, or both). Additionally or alternatively, a base station may itself determine some or all of the criteria 605 information (e.g., and may configure MIMO operation modes for a UE based at least in part on aspects of decision flow chart 600).

For example, criteria 605 may include a number of clusters criteria, a rate requirement criteria, a robustness criteria, a power consumption criteria, a temperature criteria (e.g., a thermal level criteria, a thermal distribution criteria, a critical thermal operation criteria), a beam management (BM) overhead criteria, etc. The example of FIG. 6 is shown for illustrative purposes only; other criteria may be used for MIMO operation mode determination and configuration by analogy, without departing from the scope of the present disclosure. In some cases, criteria 605 may refer to satisfaction, or dissatisfaction, of various thresholds (e.g., such as data rate threshold, a download latency threshold, an upload latency threshold, a beam management overhead threshold, a power consumption threshold, a thermal threshold, a maximum permissible exposure threshold, application requirement thresholds, BM overhead thresholds, etc.). As described herein, various criteria 605 (which in some cases may include or refer to channel characteristics, UE characteristics, application characteristics, etc.) may be used to select one or more MIMO operation modes (which may include implementations of polarization MIMO 610, spatial MIMO 615, or some combination thereof, across one or more modules of a device). As discussed, MIMO operation mode configuration may be dependent on antenna architecture constraints (e.g., antenna array architecture descriptions for device antenna modules) of the device being configured.

Generally, criteria 605, information pertaining to criteria 605, etc., may be identified by a base station 105 and/or a UE 115, may be included in UE feedback (e.g., in a UE indication of at least a subset of the channel characteristics, at least a subset of the UE characteristics, or both), may be used by a base station 105 and/or a UE 115 for determination of a MIMO operation mode, included in MIMO operation mode configuration information sent from a base station 105 to a UE 115, etc.

Figure 7:
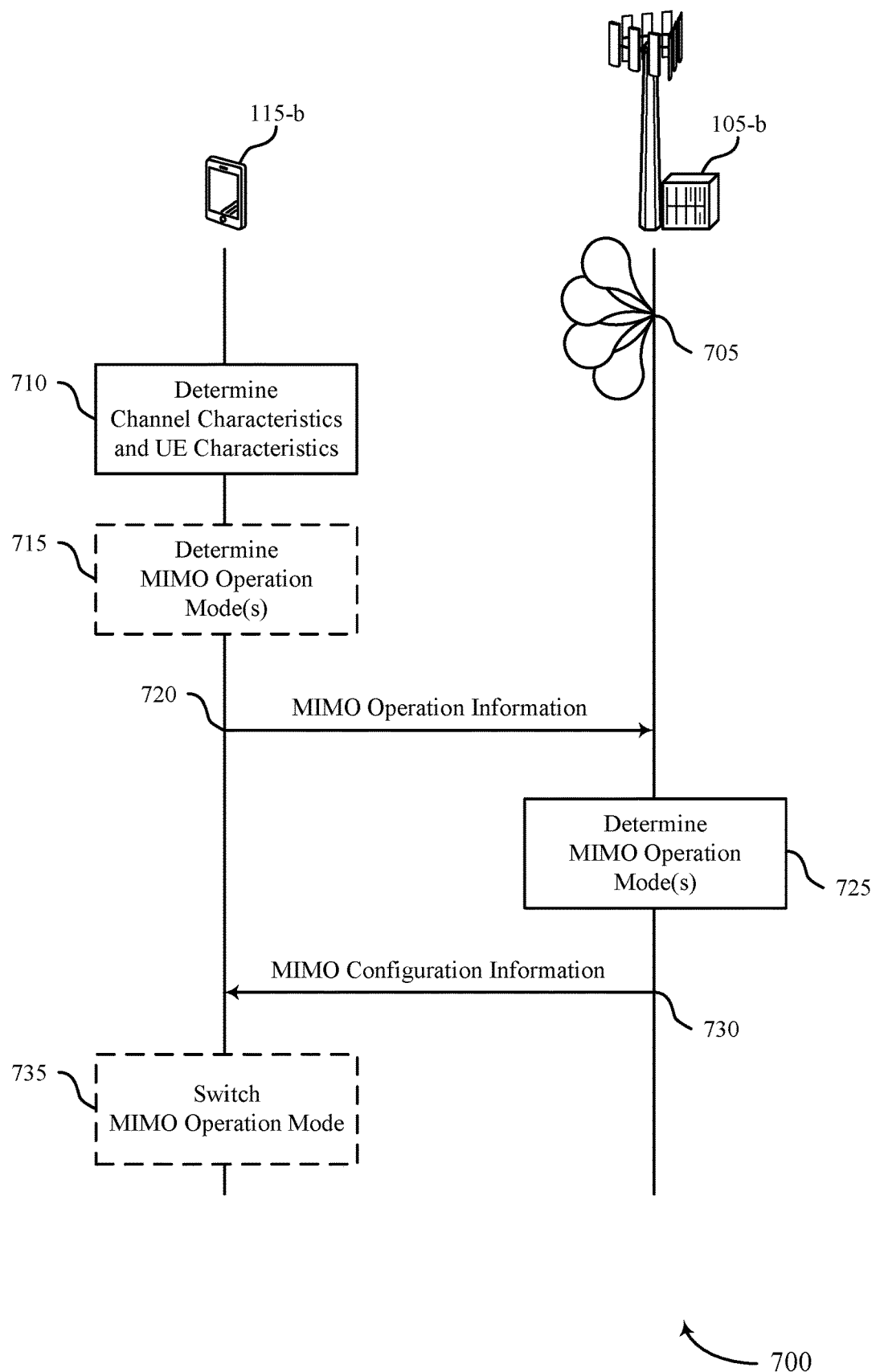
FIG. 7 illustrates an example of a process flow that supports dynamic switching between different MIMO operation modes in accordance with aspects of the present disclosure.

FIG. 7 illustrates an example of a process flow 700 that supports dynamic switching between different MIMO operation modes in accordance with aspects of the present disclosure. In some examples, process flow 700 may implement aspects of wireless communications system 100 or wireless communications system 200. Further, process flow 700 may be implemented by a UE 115-b and a base station 105-b, which may be examples of a UE 115 and a base station 105 described with reference to FIGS. 1-2 (e.g., and in some cases, UE 115-b may be an example of a device described with reference to FIGS. 1-6). In the following description of the process flow 700, the operations between UE 115-b and base station 105-b may be transmitted in a different order than the order shown, or the operations performed by base station 105-b and UE 115-b may be performed in different orders or at different times. Certain operations may also be left out of the process flow 700, or other operations may be added to the process flow 700. It is to be understood that while base station 105-b and UE 115-b are shown performing a number of the operations of process flow 700, any wireless device may perform the operations shown. As an example, in some cases, a UE 115-b may simultaneously transmit information shown in process flow 700 to one or more base stations 105 (e.g., to one or more transmission/reception points (TRPs)) and/or may receive information shown in process flow 700 from one or more base stations 105 (e.g., in addition to base station 105-b). For example, in some cases, base station 105-b may generally refer to one or more base stations 105, or one or more TRPs associated with a base station 105-b, etc.

At 705, base station 105-b may transmit a set of beams (which may be generally referred to as reference signals, synchronization signals, etc.). In some cases, 705 may refer to a beam training procedure (e.g., where a base station 105-b transmits a set of beams in a beam sweeping manner for beam identification procedures). At 705, UE 115-b may measure a signal quality of a set of receive beams transmitted from the base station 105-b. For example, the UE 115-b may measure a signal quality of the set or a subset of the beams transmitted by the base station 105-b.

At 710, UE 115-b may determine channel characteristics and/or UE characteristics for communicating with base station 105-b (e.g., over one or more of a set of antenna modules at the UE 115-b) using one or more of a set of MIMO operation modes. In some cases, the set of MIMO operation modes may include, or refer to, a set of MIMO operation modes each implementing polarization MIMO, spatial MIMO, or some combination thereof using one or more antenna modules of the set of antenna modules at the UE 115-b. For example, in some cases, the set of MIMO modes comprises a polarization MIMO mode and a spatial MIMO mode. In some cases, the set of antenna modules comprises antenna elements and one or more RFFEs controlling the transmission or reception from the antenna elements.

In some cases, determining channel characteristics may refer to determining a number of dominant clusters in a channel based on measuring the signal quality of the set of receive beams (e.g., at 705). In some examples, determining channel characteristics may refer to determining blockage conditions at the UE 115-b and associated robustness thresholds based on the blockage conditions (e.g., where the blockage conditions may be based on a measurement at the UE 115-b of a physical object blocking signal transmission or reception with base station 105-b). In some cases, determining UE characteristics may refer to determining a data rate threshold (e.g., based on an application running at the UE 115-b), a download latency threshold (e.g., based on an application running at the UE 115-b), an upload latency threshold (e.g., based on an application running at the UE 115-b), a beam management overhead threshold, a power consumption threshold (e.g., based on a power source measurement at the UE 115-b), a thermal threshold (e.g., based on a thermal measurement at the UE 115-b), a maximum permissible exposure threshold (e.g., based on an exposure or regulatory compliance requirement measurement at the UE 115-b), or a combination thereof. In some cases, determining UE characteristics may refer to identifying an antenna array architecture for one or more of the set of antenna modules of the UE 115-b.

At 715, UE 115-b may, in some cases, determine a MIMO operation mode of the plurality of MIMO operation modes (e.g., for one or more of the plurality of antenna modules of the UE 115-b) for communicating with the base station 105-b based at least in part on the channel characteristics, the UE characteristics, or both.

At 720, UE 115-b may transmit MIMO operation information (e.g., UE feedback) to base station 105-b. In some cases, the MIMO operation information may include an indication of at least a subset of the channel characteristics, at least a subset of the UE characteristics, or both. Additionally or alternatively, the MIMO operation information may include an indication of a requested beam management configuration (e.g., in cases where a MIMO operation mode for communicating with the base station 105-b is determined at 715). For example, a requested beam management configuration may indicate a requested MIMO operation mode for one or more of the set of antenna modules of the UE 115-b. In some examples, the requested beam management configuration may indicate a set of TCI states for one or more of the set of antenna modules of the UE 115-b. In some cases, the MIMO operation information may be sent over one or more transmissions (e.g., in some cases, the indication of at least a subset of the channel characteristics, at least a subset of the UE characteristics, or both, and the beam management configuration request may be indicated over separate transmissions or may be included in a same indication).

In general, UE 115-b may feedback any MIMO operation information to base station 105-b (e.g., at 720). As discussed herein, MIMO operation information that may be used for MIMO operation mode configuration may include UE characteristics, channel characteristics, requested beam management configurations (e.g., requested MIMO operation modes for one or more antenna modules of the UE 115-b), various MIMO operation mode selection criteria, etc. For example, MIMO operation information may include a data rate threshold, a download latency threshold, an upload latency threshold, a beam management overhead threshold, a power consumption threshold, a thermal threshold, a maximum permissible exposure threshold, etc. In some cases, MIMO operation information may further include various metrics associated with MIMO operation modes. For example, MIMO operation information may indicate, for some MIMO operation mode (e.g., for some polarization MIMO and/or spatial MIMO across one or more antenna modules of the UE 115-b), data rate metrics, download/upload latency metrics, power consumption metrics, thermal metrics etc.

At 725, base station 105-b may determine one or more MIMO operation modes for the UE 115-b. For example, base station 105-b may determine, for one or more of the set of antenna modules at the UE 115-b, a MIMO mode (e.g., a MIMO operation mode) from the set of MIMO modes for communicating with the UE 115-b over the one or more of the set of antenna modules. In some cases, the MIMO mode is determined, for the one or more of the set of antenna modules at the UE 115-b, based on the requested beam management configuration (e.g., in cases where base station 105-b received an indication of a requested beam management configuration at 720).

In some examples, base station 105-b may select a set of TCI states for one or more of the set of antenna modules at the UE 115-b, where the MIMO mode may be determined, for the one or more of the set of antenna modules at the UE 115-b, based on the set of TCI states. In some cases, the set of TCI states may be selected based on the MIMO operation information received at 720.

In some examples, base station 105-b may determine a network condition where the MIMO mode is determined, for the one or more of the set of antenna modules at the UE 115-b, based on the network condition. In some cases, the network condition comprises a number of dominant clusters in a channel, a blockage condition associated with the channel, a network data rate threshold, a network latency threshold, a network beam management overhead threshold, a power consumption threshold, a thermal threshold, a maximum permissible exposure threshold, or a combination thereof. In general, the base station 105-b may determine one or more MIMO operation modes for the UE 115-b based on the MIMO operation information received at 720, its own sense of the network, or some combination thereof.

At 730, base station 105-b may transmit MIMO configuration information (e.g., a configuration indicating a selection of a MIMO mode of the set of MIMO modes for the one or more of the set of antenna modules of the UE 115-b) to the UE 115-b.

At 735, in some examples, UE 115-b may switch from a first MIMO mode to a second MIMO mode based on receiving the configuration (e.g., based on the MIMO configuration information received at 730). In some cases, the base station 105-b may also switch from a first MIMO mode to a second MIMO mode based on transmitting the configuration (e.g., based on the MIMO configuration information transmitted at 730).

Figure 8:
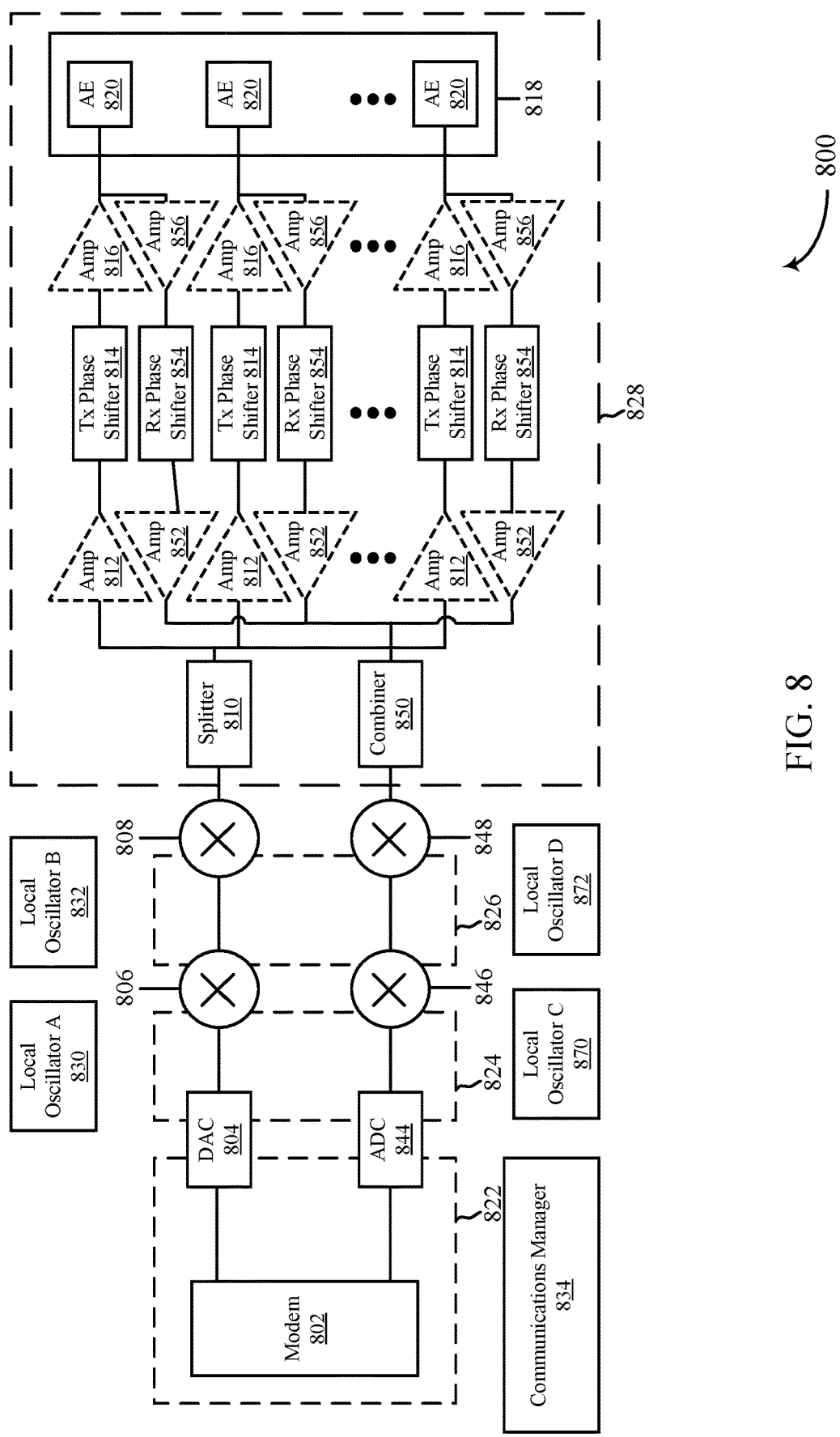
FIG. 8 illustrates an example of an architecture that supports dynamic switching between different MIMO operation modes in accordance with aspects of the present disclosure.

FIG. 8 illustrates an example of an architecture 800 that supports dynamic switching between different MIMO operation modes in accordance with aspects of the present disclosure. In some examples, architecture 800 may implement aspects of wireless communications system 100 and/or 200. In some aspects, architecture 800 may be an example of aspects of a device, a base station 105, or a UE 115, as described herein.

Broadly, FIG. 8 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 800 includes a modem (modulator/demodulator) 802, a digital to analog converter (DAC) 804, a first mixer 806, a second mixer 808, and a splitter 810. The architecture 800 also includes a plurality of first amplifiers 812, a plurality of phase shifters 814, a plurality of second amplifiers 816, and an antenna array 818 that includes a plurality of antenna elements 820. Transmission lines or other waveguides, wires, traces, or the like are shown connecting the various components to illustrate how signals to be transmitted may travel between components. Boxes 822, 824, 826, and 828 indicate regions in the architecture 800 in which different types of signals travel or are processed. Specifically, box 822 indicates a region in which digital baseband signals travel or are processed, box 824 indicates a region in which analog baseband signals travel or are processed, box 826 indicates a region in which analog intermediate frequency (IF) signals travel or are processed, and box 828 indicates a region in which analog radio frequency (RF) signals travel or are processed. The architecture also includes a local oscillator A 830, a local oscillator B 832, and a communications manager 834.

Each of the antenna elements 820 may include one or more sub-elements (not shown) for radiating or receiving RF signals. For example, a single antenna element 820 may include a first sub-element cross-polarized with a second sub-element that can be used to independently transmit cross-polarized signals. The antenna elements 820 may include patch antennas, dipole antennas, metamaterial antennas, or other types of antennas arranged in a linear, two dimensional, circular, or other pattern. A spacing between antenna elements 820 may be such that signals with a desired wavelength transmitted separately by the antenna elements 820 may interact or interfere (e.g., to form a desired beam). For example, given an expected range of wavelengths or frequencies, the spacing may provide a half wavelength, or other fraction of a half wavelength of spacing between neighboring antenna elements 820 to allow for interaction or interference of signals transmitted by the separate antenna elements 820 within that expected range.

The modem 802 processes and generates digital baseband signals and may also control operation of the DAC 804, first and second mixers 806, 808, splitter 810, first amplifiers 812, phase shifters 814, and/or the second amplifiers 816 to transmit signals via one or more or all of the antenna elements 820. The modem 802 may process signals and control operation in accordance with a communication standard such as a wireless standard discussed herein. The DAC 804 may convert digital baseband signals received from the modem 802 (and that are to be transmitted) into analog baseband signals. The first mixer 806 upconverts analog baseband signals to analog IF signals within an IF using a local oscillator A 830. For example, the first mixer 806 may mix the signals with an oscillating signal generated by the local oscillator A 830 to "move" the baseband analog signals to the IF. In some cases some processing or filtering (not shown) may take place at the IF. The second mixer 808 upconverts the analog IF signals to analog RF signals using the local oscillator B 832. Similarly to the first mixer, the second mixer 808 may mix the signals with an oscillating signal generated by the local oscillator B 832 to "move" the IF analog signals to the RF, or the frequency at which signals will be transmitted or received. The modem 802 and/or the communications manager 834 may adjust the frequency of local oscillator A 830 and/or the local oscillator B 832 so that a desired IF and/or RF frequency is produced and used to facilitate processing and transmission of a signal within a desired bandwidth.

In the illustrated architecture 800, signals upconverted by the second mixer 808 are split or duplicated into multiple signals by the splitter 810. The splitter 810 in architecture 800 splits the RF signal into a plurality of identical or nearly identical RF signals, as denoted by its presence in box 828. In other examples, the split may take place with any type of signal including with baseband digital, baseband analog, or IF analog signals. Each of these signals may correspond to an antenna element 820. The signal travels through and is processed by amplifiers 812, 816, phase shifters 814, and/or other elements corresponding to the respective antenna element 820 to be provided to and transmitted by the corresponding antenna element 820 of the antenna array 818. In one example, the splitter 810 may be an active splitter that is connected to a power supply and provides some gain so that RF signals exiting the splitter 810 are at a power level equal to or greater than the signal entering the splitter 810. In another example, the splitter 810 is a passive splitter that is not connected to a power supply and the RF signals exiting the splitter 810 may be at a power level lower than the RF signal entering the splitter 810.

After being split by the splitter 810, the resulting RF signals may enter an amplifier, such as a first amplifier 812, or a phase shifter 814 corresponding to an antenna element 820. The first and second amplifiers 812, 816 are illustrated with dashed lines because one or both might not be necessary in some implementations. In one implementation, both the first amplifier 812 and second amplifier 816 are present. In another, neither the first amplifier 812 nor the second amplifier 816 is present. In other implementations, one of the two amplifiers 812, 816 is present but not the other. By way of example, if the splitter 810 is an active splitter, the first amplifier 812 may not be used. By way of further example, if the phase shifter 814 is an active phase shifter that can provide a gain, the second amplifier 816 might not be used. The amplifiers 812, 816 may provide a desired level of positive or negative gain. A positive gain (positive dB) may be used to increase an amplitude of a signal for radiation by a specific antenna element 820. A negative gain (negative dB) may be used to decrease an amplitude and/or suppress radiation of the signal by a specific antenna element. Each of the amplifiers 812, 816 may be controlled independently (e.g., by the modem 802 or communications manager 834) to provide independent control of the gain for each antenna element 820. For example, the modem 802 and/or the communications manager 834 may have at least one control line connected to each of the splitter 810, first amplifiers 812, phase shifters 814, and/or second amplifiers 816 which may be used to configure a gain to provide a desired amount of gain for each component and thus each antenna element 820.

The phase shifter 814 may provide a configurable phase shift or phase offset to a corresponding RF signal to be transmitted. The phase shifter 814 could be a passive phase shifter not directly connected to a power supply. Passive phase shifters might introduce some insertion loss. The second amplifier 816 could boost the signal to compensate for the insertion loss. The phase shifter 814 could be an active phase shifter connected to a power supply such that the active phase shifter provides some amount of gain or prevents insertion loss. The settings of each of the phase shifters 814 are independent meaning that each can be set to provide a desired amount of phase shift, the same amount of phase shift, or some other configuration. The modem 802 and/or the communications manager 834 may have at least one control line connected to each of the phase shifters 814 and which may be used to configure the phase shifters 814 to provide a desired amounts of phase shift or phase offset between antenna elements 820.

In the illustrated architecture 800, RF signals received by the antenna elements 820 are provided to one or more of first amplifier 856 to boost the signal strength. The first amplifier 856 may be connected to the same antenna arrays 818, e.g., for TDD operations. The first amplifier 856 may be connected to different antenna arrays 818. The boosted RF signal is input into one or more of phase shifter 854 to provide a configurable phase shift or phase offset for the corresponding received RF signal. The phase shifter 854 may be an active phase shifter or a passive phase shifter. The settings of the phase shifters 854 are independent, meaning that each can be set to provide a desired amount of phase shift, the same amount of phase shift, or some other configuration. The modem 802 and/or the communications manager 834 may have at least one control line connected to each of the phase shifters 854 and which may be used to configure the phase sifters 854 to provide a desired amount of phase shift or phase offset between antenna elements 820.

The outputs of the phase shifters 854 may be input to one or more second amplifiers 852 for signal amplification of the phase shifted received RF signals. The second amplifiers 852 may be individually configured to provide a configured amount of gain. The second amplifiers 852 may be individually configured to provide an amount of gain to ensure that the signal input to combiner 850 have the same magnitude. The amplifiers 852 and/or 856 are illustrated in dashed lines because they might not be necessary in some implementations. In one implementation, both the amplifier 852 and the amplifier 856 are present. In another, neither the amplifier 852 nor the amplifier 856 are present. In other implementations, one of the amplifiers 852, 856 is present but not the other.

In the illustrated architecture 800, signals output by the phase shifters 854 (via the amplifiers 852 when present) are combined in combiner 850. The combiner 850 in architecture combines the RF signal into a signal, as denoted by its presence in box 828. The combiner 850 may be a passive combiner, e.g., not connected to a power source, which may result in some insertion loss. The combiner 850 may be an active combiner, e.g., connected to a power source, which may result in some signal gain. When combiner 850 is an active combiner, it may provide a different (e.g., configurable) amount of gain for each input signal so that the input signals have the same magnitude when they are combined. When combiner 850 is an active combiner, it may not need the second amplifier 852 because the active combiner may provide the signal amplification.

The output of the combiner 850 is input into mixers 848 and 846. Mixers 848 and 846 generally down convert the received RF signal using inputs from local oscillators 872 and 870, respectively, to create intermediate or baseband signals that carry the encoded and modulated information.

The output of the mixers 848 and 846 are input into an analog-to-digital converter (ADC) 844 for conversion to analog signals. The analog signals output from ADC 844 is input to modem 802 for baseband processing, e.g., decoding, de-interleaving, etc.

The architecture 800 is given by way of example only to illustrate an architecture for transmitting and/or receiving signals. It will be understood that the architecture 800 and/or each portion of the architecture 800 may be repeated multiple times within an architecture to accommodate or provide an arbitrary number of RF chains, antenna elements, and/or antenna panels. Furthermore, numerous alternate architectures are possible and contemplated. For example, although only a single antenna array 818 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 822, 824, 826, 828) in different implemented architectures. For example, a split of the signal to be transmitted into a plurality of signals may take place at the analog RF, analog IF, analog baseband, or digital baseband frequencies in different examples. Similarly, amplification and/or phase shifts may also take place at different frequencies. For example, in some contemplated implementations, one or more of the splitter 810, amplifiers 812, 816, or phase shifters 814 may be located between the DAC 804 and the first mixer 806 or between the first mixer 806 and the second mixer 808. In one example, the functions of one or more of the components may be combined into one component. For example, the phase shifters 814 may perform amplification to include or replace the first and/or or second amplifiers 812, 816. By way of another example, a phase shift may be implemented by the second mixer 808 to obviate the need for a separate phase shifter 814. This technique is sometimes called local oscillator (LO) phase shifting. In one implementation of this configuration, there may be a plurality of IF to RF mixers (e.g., for each antenna element chain) within the second mixer 808 and the local oscillator B 832 would supply different local oscillator signals (with different phase offsets) to each IF to RF mixer.

The modem 802 and/or the communications manager 834 may control one or more of the other components 804-872 to select one or more antenna elements 820 and/or to form beams for transmission of one or more signals. For example, the antenna elements 820 may be individually selected or deselected for transmission of a signal (or signals) by controlling an amplitude of one or more corresponding amplifiers, such as the first amplifiers 812 and/or the second amplifiers 816. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 820, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 818) can be dynamically controlled by modifying the phase shifts or phase offsets imparted by the phase shifters 814 and amplitudes imparted by the amplifiers 812, 816 of the plurality of signals relative to each other.

The communications manager 834 may, when architecture 800 is configured as a receiving device, transmit a first beam measurement report to a first wireless device, the first beam measurement report indicating a first set of beam measurements for a wireless channel between the first wireless device and the second wireless device. The communications manager 834 may receive from the first wireless device a cluster validity metric for at least one beam in the first beam measurement report. The communications manager 834 may transmit to the first wireless device a second beam measurement report based at least in part on the cluster validity metric, the second beam measurement report indicating a second set of beam measurements for the wireless channel, as discussed herein. The communications manager 834 may, when architecture 800 is configured as a transmitting device, receive a first beam measurement report from a second wireless device, the first beam measurement report indicating a first set of beam measurements for a wireless channel between the first wireless device and the second wireless device. The communications manager 834 may transmit to the second wireless device a cluster validity metric for at least one beam in the first beam measurement report. The communications manager 834 may receive from the second wireless device, in response to transmitting the cluster validity metric, a second beam measurement report indicating a second set of beam measurements for the wireless channel. The communications manager 834 may select a beam for transmitting to the second wireless device based at least in part on the first and second beam measurement reports, as discussed herein. The communications manager 834 may be located partially or fully within one or more other components of the architecture 800. For example, the communications manager 834 may be located within the modem 802 in at least one implementation.

Figure 9:
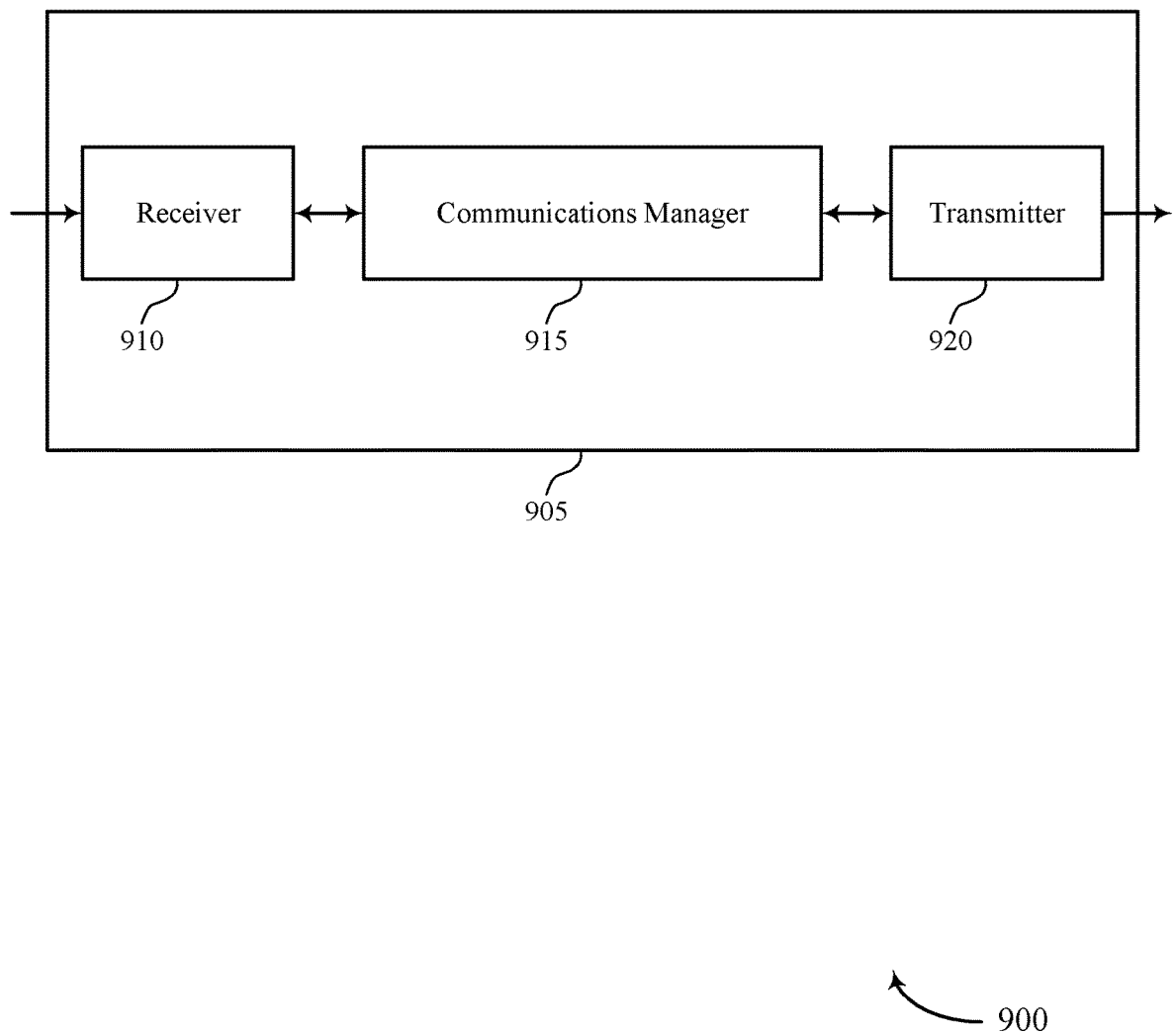
FIGS. 9 and 10 show block diagrams of devices that support dynamic switching between different MIMO operation modes in accordance with aspects of the present disclosure.

FIG. 9 shows a block diagram 900 of a device 905 that supports dynamic switching between different MIMO operation modes in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to dynamic switching between different MIMO operation modes, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine channel characteristics and UE characteristics for communicating with one or more base stations over one or more of a set of antenna modules at the UE using one or more of a set of multiple input multiple output operation modes, transmit an indication of at least a subset of the channel characteristics, at least a subset of the UE characteristics, or both, and receive a configuration indicating a selection of a multiple input multiple output operation mode of the set of multiple input multiple output operation modes for the one or more of the set of antenna modules based on transmitting the indication. The communications manager 915 may be an example of aspects of the communications manager 1210 described herein.

The actions performed by the communications manager 915 as described herein may be implemented to realize one or more potential advantages. For example, the communications manager 915 may determine and indicate channel characteristics and UE characteristics such that MIMO modes utilizing increased RF chain capabilities of the device 905 may be configured. Communications manager 915 may, according to the described techniques, provide for efficient indication (e.g., signaling) of support of various MIMO operation modes (e.g., efficient device 905 indication to a base station of support of various different MIMO modes of operation, of performance metrics associated with different MIMO modes of operation, of thermal and power consumption ramifications associated with different MIMO modes of operation, etc.). Communications manager 915 may thus be configured operate according to various MIMO operation modes (e.g., according to application needs, rate optimizations, UE power optimizations, UE thermal optimizations, etc.).

The communications manager 915, or its sub-components, may be implemented in hardware, code (e.g., software or firmware) executed by a processor, or any combination thereof. If implemented in code executed by a processor, the functions of the communications manager 915 or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
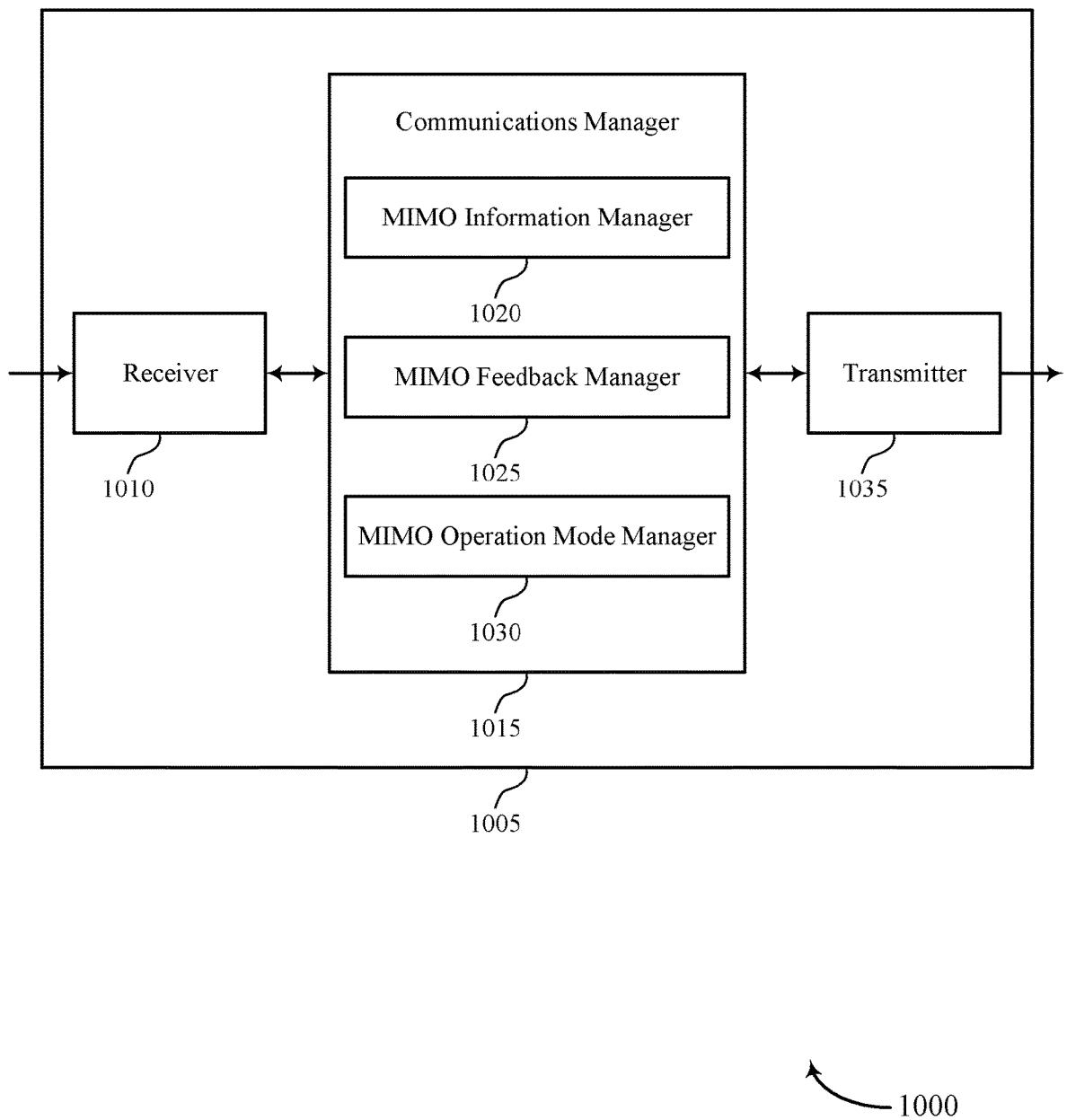

FIG. 10 shows a block diagram 1000 of a device 1005 that supports dynamic switching between different MIMO operation modes in accordance with aspects of the present disclosure. The device 1005 may be an example of aspects of a device 905 or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to dynamic switching between different MIMO operation modes, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a MIMO information manager 1020, a MIMO feedback manager 1025, and a MIMO operation mode manager 1030. The communications manager 1015 may be an example of aspects of the communications manager 1210 described herein.

The MIMO information manager 1020 may determine channel characteristics and UE characteristics for communicating with one or more base stations over one or more of a set of antenna modules at the UE using one or more of a set of multiple input multiple output operation modes. The MIMO feedback manager 1025 may transmit an indication of at least a subset of the channel characteristics, at least a subset of the UE characteristics, or both. The MIMO operation mode manager 1030 may receive a configuration indicating a selection of a multiple input multiple output operation mode of the set of multiple input multiple output operation modes for the one or more of the set of antenna modules based on transmitting the indication.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
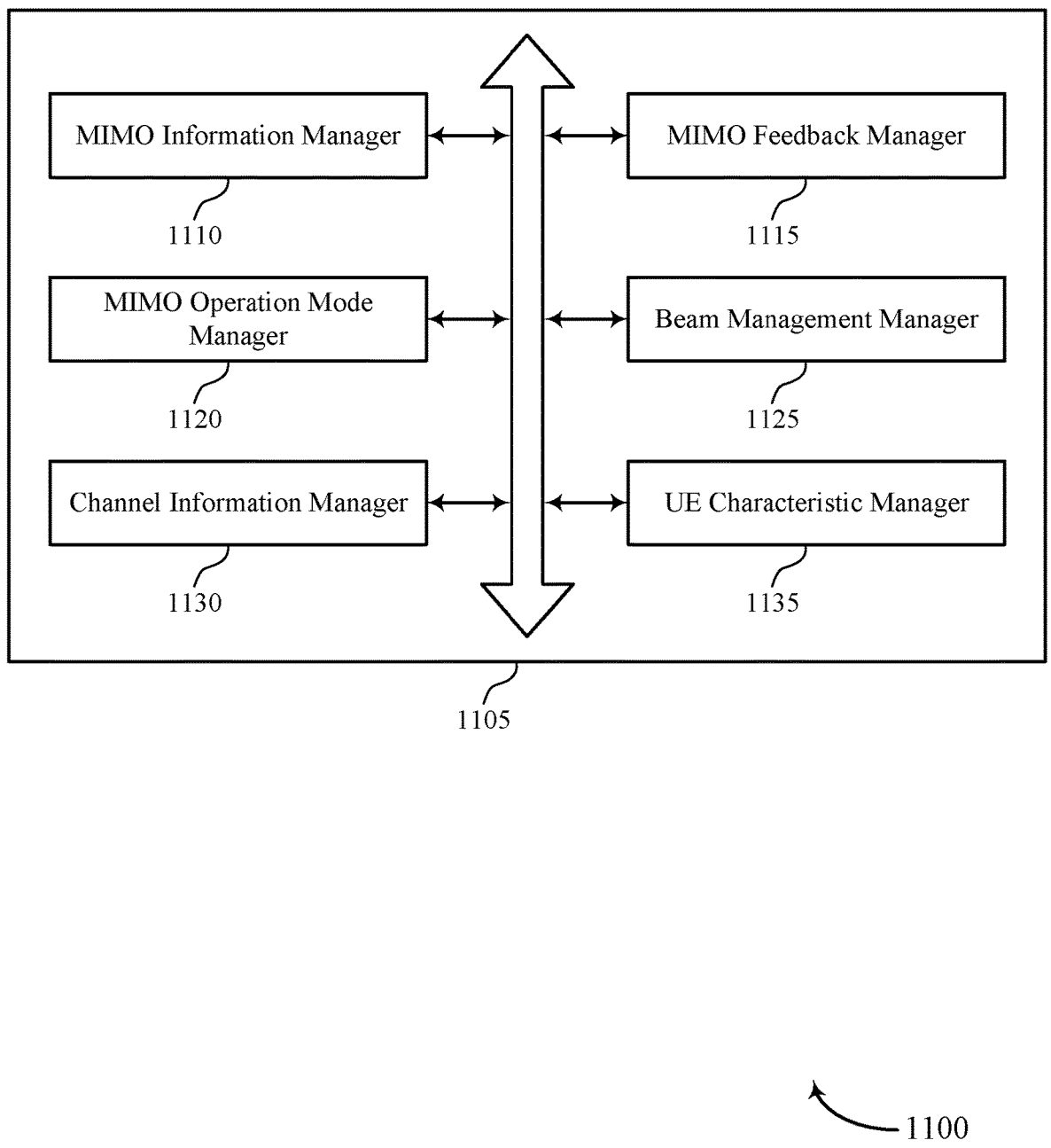
FIG. 11 shows a block diagram of a communications manager that supports dynamic switching between different MIMO operation modes in accordance with aspects of the present disclosure.

FIG. 11 shows a block diagram 1100 of a communications manager 1105 that supports dynamic switching between different MIMO operation modes in accordance with aspects of the present disclosure. The communications manager 1105 may be an example of aspects of a communications manager 915, a communications manager 1015, or a communications manager 1210 described herein. The communications manager 1105 may include a MIMO information manager 1110, a MIMO feedback manager 1115, a MIMO operation mode manager 1120, a beam management manager 1125, a channel information manager 1130, and a UE characteristic manager 1135. Each of these modules may communicate, directly or indirectly, with one another (e.g., via one or more buses).

The MIMO information manager 1110 may determine channel characteristics and UE characteristics for communicating with one or more base stations over one or more of a set of antenna modules at the UE using one or more of a set of multiple input multiple output operation modes. In some cases, the set of antenna modules includes antenna elements and one or more radio frequency front ends controlling the transmission or reception from the antenna elements.

The MIMO feedback manager 1115 may transmit an indication of at least a subset of the channel characteristics, at least a subset of the UE characteristics, or both.

The MIMO operation mode manager 1120 may receive a configuration indicating a selection of a multiple input multiple output operation mode of the set of multiple input multiple output operation modes for the one or more of the set of antenna modules based on transmitting the indication.

In some examples, the MIMO operation mode manager 1120 may determine a multiple input multiple output operation mode of the set of multiple input multiple output operation modes for each of the set of antenna modules for communicating with the one or more base stations based on the channel characteristics, the UE characteristics, or both. In some examples, the MIMO operation mode manager 1120 may switch from a first multiple input multiple output operation mode to a second multiple input multiple output operation mode based on receiving the configuration. In some cases, the set of multiple input multiple output operation modes includes a polarization multiple input multiple output operation mode and a spatial multiple input multiple output operation mode.

The beam management manager 1125 may transmit an indication of a requested beam management configuration based on determining the multiple input multiple output operation mode for communicating with the one or more base stations. In some cases, the requested beam management configuration indicates a requested multiple input multiple output operation mode for one or more of the set of antenna modules. In some cases, the requested beam management configuration indicates a set of transmission configuration indicator states for one or more of the set of antenna modules.

The channel information manager 1130 may measure a signal quality of a set of receive beams transmitted from the one or more base stations. In some examples, the channel information manager 1130 may determine a number of dominant clusters in a channel based on measuring the signal quality of the set of receive beams. In some examples, the channel information manager 1130 may determine blockage conditions at the UE and associated robustness thresholds based on the blockage conditions. In some cases, the set of receive beams are based on a base station beam training procedure. In some cases, the blockage conditions are based on a measurement at the UE of a physical object blocking signal transmission or reception with the one or more base stations.

The UE characteristic manager 1135 may determine one or more of a data rate threshold, a download latency threshold, an upload latency threshold, a beam management overhead threshold, a power consumption threshold, a thermal threshold, or a maximum permissible exposure threshold. In some examples, the UE characteristic manager 1135 may identify an antenna array architecture for one or more of the set of antenna modules. In some cases, the data rate threshold is based on an application running at the UE. In some cases, the download latency threshold, the upload latency threshold, or both, are based on an application running at the UE. In some cases, the power consumption threshold is based on a power source measurement at the UE. In some cases, the thermal threshold is based on a thermal measurement at the UE. In some cases, the maximum permissible exposure threshold is based on an exposure or regulatory compliance requirement measurement at the UE.

Figure 12:
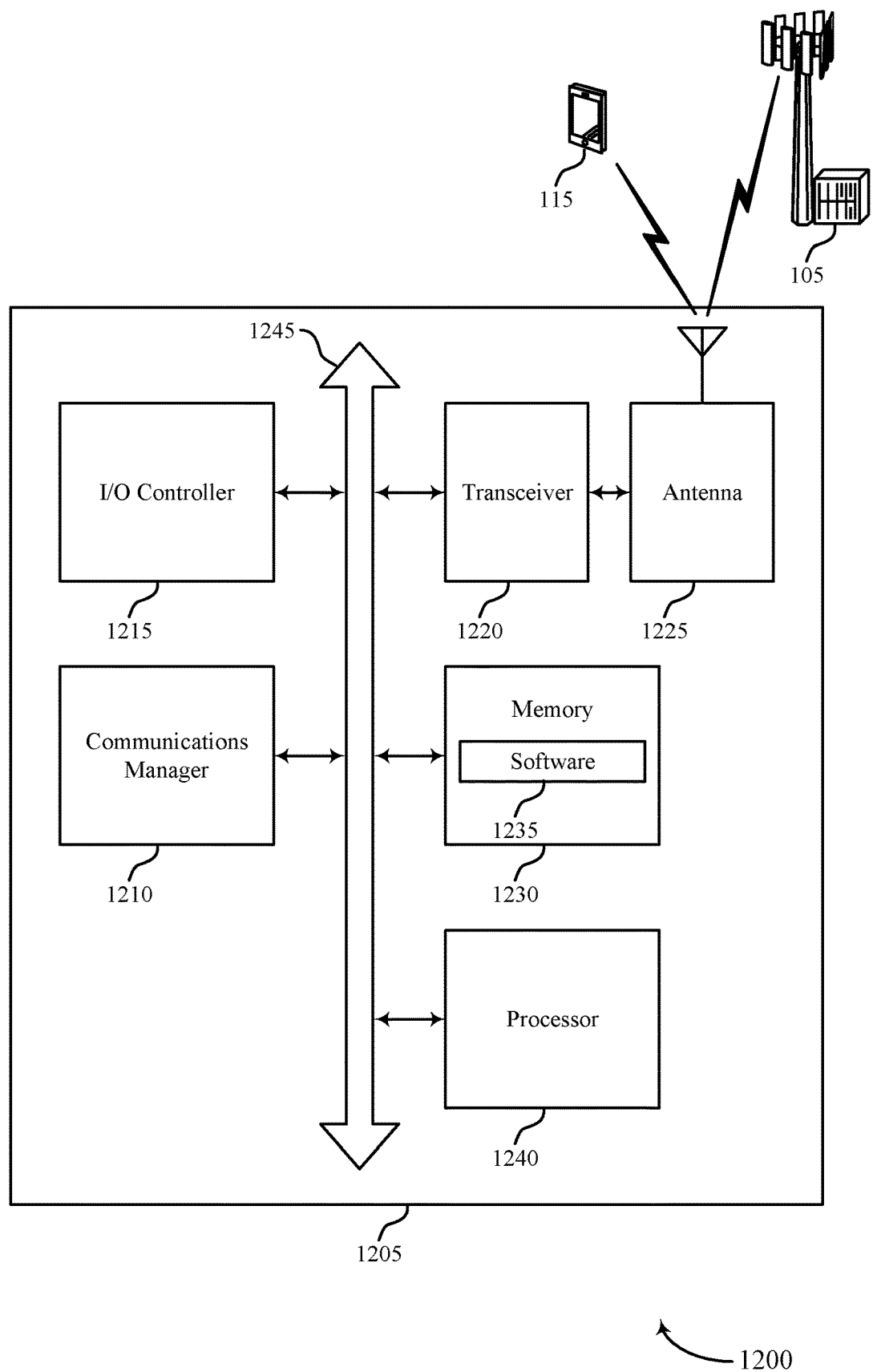
FIG. 12 shows a diagram of a system including a device that supports dynamic switching between different MIMO operation modes in accordance with aspects of the present disclosure.

FIG. 12 shows a diagram of a system 1200 including a device 1205 that supports dynamic switching between different MIMO operation modes in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may determine channel characteristics and UE characteristics for communicating with one or more base stations over one or more of a set of antenna modules at the UE using one or more of a set of multiple input multiple output operation modes, transmit an indication of at least a subset of the channel characteristics, at least a subset of the UE characteristics, or both, and receive a configuration indicating a selection of a multiple input multiple output operation mode of the set of multiple input multiple output operation modes for the one or more of the set of antenna modules based on transmitting the indication.

The actions performed by the communications manager 1210 and the device 1205 as described herein may be implemented to realize one or more potential advantages. One implementation may allow a device 1205 to improve wireless communications performance (e.g., rate increase, robustness via beam switching/multi-beam operations across different antenna modules, etc.) via configuration of MIMO modes utilizing multiple RF chains to operate according to various MIMO operation modes (e.g., modes that include polarization MIMO, spatial MIMO, or combinations thereof). Another implementation may allow device 1205 to indicate support of various MIMO operation modes in order to provide efficient configuration of device 1205 (e.g., according to application needs, rate optimizations, UE power optimizations, UE thermal optimizations, etc.). As such, device 1205 may efficiently (e.g., and dynamically) switch between various MIMO operation modes. For example, configuration of such MIMO modes may increase transmission throughput and reliability via utilization of the increased RF chain capabilities. For instance, configurable MIMO modes may allow device 1205 to receive data with increased reliability and robustness. Various device 1205 benefits may also be realized via configuration of improved MIMO modes such as reduced power consumption, improved thermal distribution, etc.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code or software 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic switching between different MIMO operation modes).

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
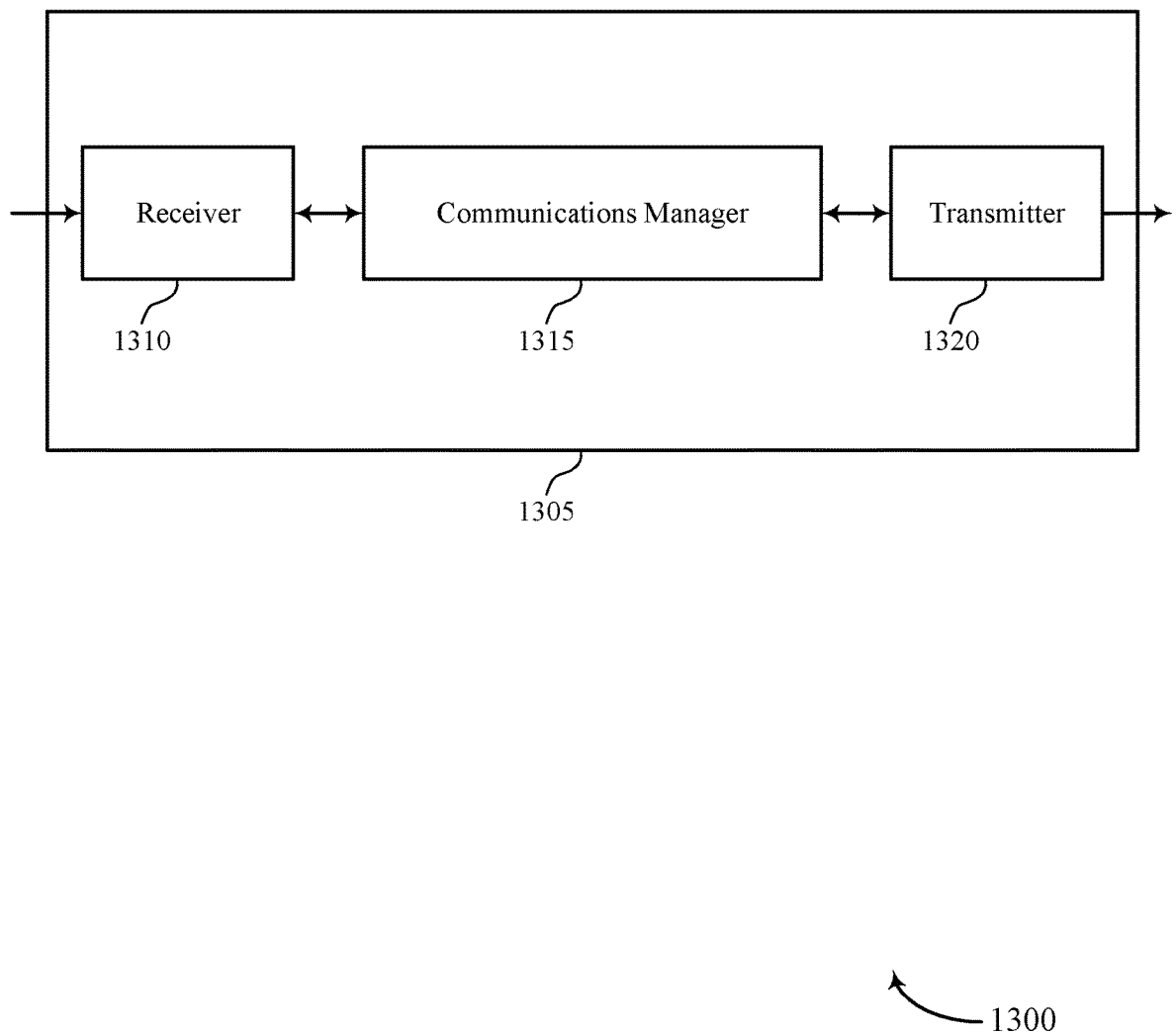
FIGS. 13 and 14 show block diagrams of devices that support dynamic switching between different MIMO operation modes in accordance with aspects of the present disclosure.

FIG. 13 shows a block diagram 1300 of a device 1305 that supports dynamic switching between different MIMO operation modes in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to dynamic switching between different MIMO operation modes, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive an indication of at least a subset of channel characteristics measured at a UE, at least a subset of UE characteristics at the UE, or both, determine, for one or more of a set of antenna modules at the UE, a multiple input multiple output operation mode from a set of multiple input multiple output operation modes for communicating with the UE over the one or more of the set of antenna modules, and transmit a configuration indicating the determined multiple input multiple output operation mode for the one or more of the set of antenna modules. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
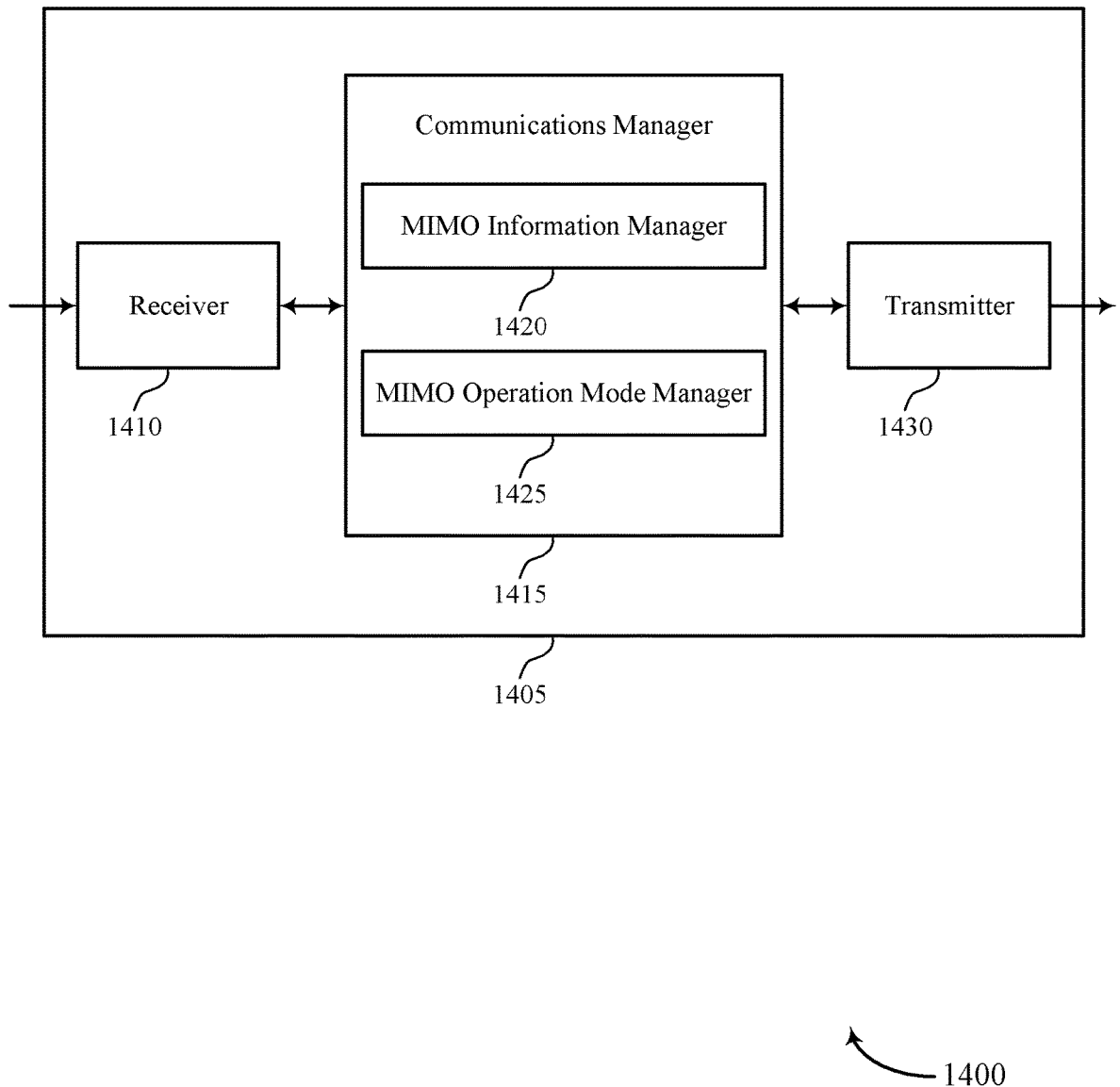

FIG. 14 shows a block diagram 1400 of a device 1405 that supports dynamic switching between different MIMO operation modes in accordance with aspects of the present disclosure. The device 1405 may be an example of aspects of a device 1305, or a base station 105 as described herein. The device 1405 may include a receiver 1410, a communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to dynamic switching between different MIMO operation modes, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a MIMO information manager 1420 and a MIMO operation mode manager 1425. The communications manager 1415 may be an example of aspects of the communications manager 1610 described herein.

The MIMO information manager 1420 may receive an indication of at least a subset of channel characteristics measured at a UE, at least a subset of UE characteristics at the UE, or both. The MIMO operation mode manager 1425 may determine, for one or more of a set of antenna modules at the UE, a multiple input multiple output operation mode from a set of multiple input multiple output operation modes for communicating with the UE over the one or more of the set of antenna modules and transmit a configuration indicating the determined multiple input multiple output operation mode for the one or more of the set of antenna modules.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1620 described with reference to FIG. 16. The transmitter 1430 may utilize a single antenna or a set of antennas.

Figure 15:
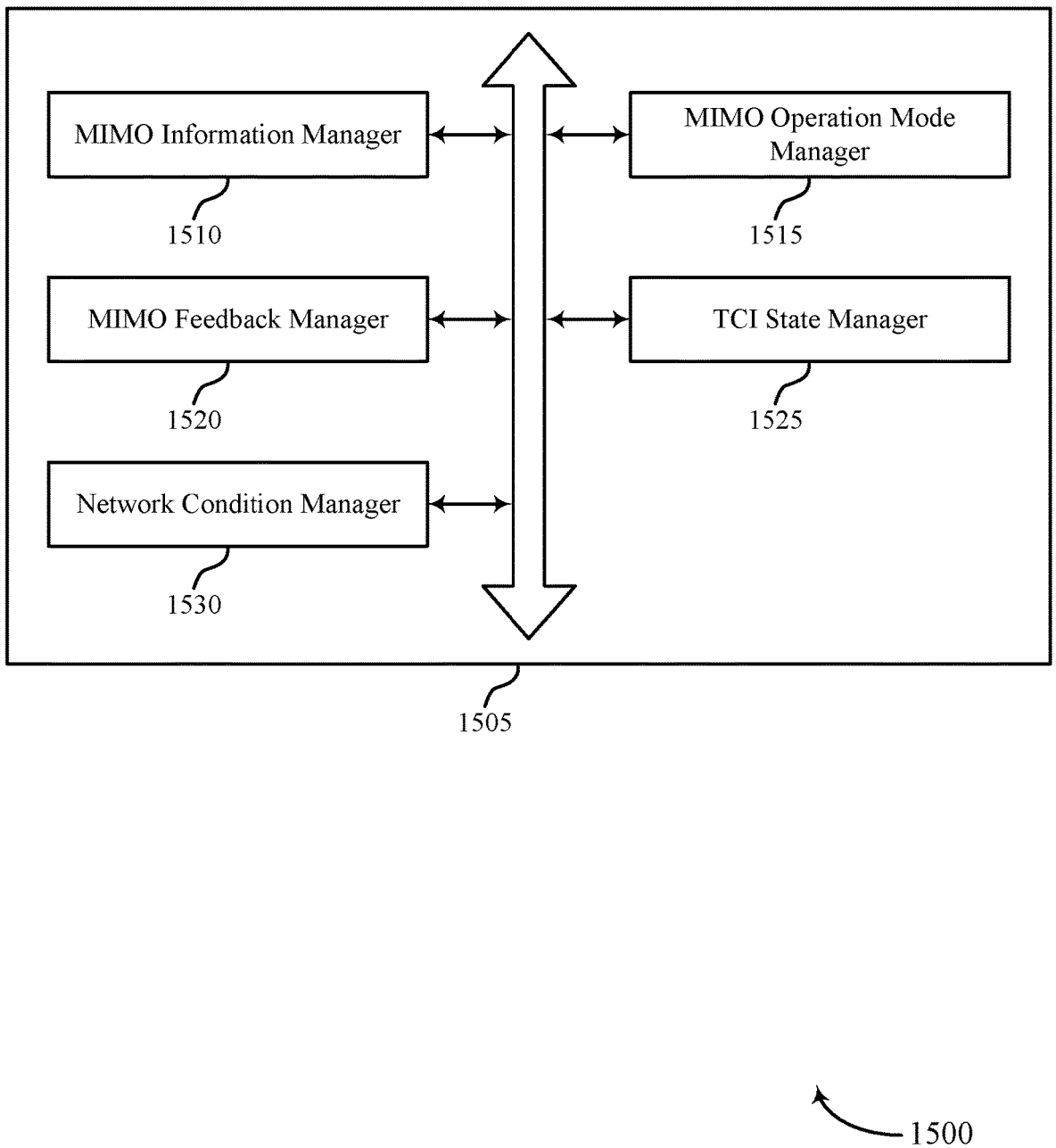
FIG. 15 shows a block diagram of a communications manager that supports dynamic switching between different MIMO operation modes in accordance with aspects of the present disclosure.

FIG. 15 shows a block diagram 1500 of a communications manager 1505 that supports dynamic switching between different MIMO operation modes in accordance with aspects of the present disclosure. The communications manager 1505 may be an example of aspects of a communications manager 1315, a communications manager 1415, or a communications manager 1610 described herein. The communications manager 1505 may include a MIMO information manager 1510, a MIMO operation mode manager 1515, a MIMO feedback manager 1520, a TCI state manager 1525, and a network condition manager 1530. Each of these modules may communicate, directly or indirectly, with one another (e.g., via one or more buses).

The MIMO information manager 1510 may receive an indication of at least a subset of channel characteristics measured at a UE, at least a subset of UE characteristics at the UE, or both. In some cases, the subset of channel characteristics measured at the UE includes a signal quality of a set of receive beams transmitted from one or more base stations, a number of dominant clusters in a channel, a blockage condition at the UE and an associated robustness threshold based on the blockage condition, or some combination thereof. In some cases, the subset of UE characteristics at the UE includes one or more of a data rate threshold, a download latency threshold, an upload latency threshold, a beam management overhead threshold, a power consumption threshold, a thermal threshold, or a maximum permissible exposure threshold. In some cases, the subset of UE characteristics at the UE includes an antenna array architecture description for one or more of the set of antenna modules at the UE.

The MIMO operation mode manager 1515 may determine, for one or more of a set of antenna modules at the UE, a multiple input multiple output operation mode from a set of multiple input multiple output operation modes for communicating with the UE over the one or more of the set of antenna modules. In some examples, the MIMO operation mode manager 1515 may transmit a configuration indicating the determined multiple input multiple output operation mode for the one or more of the set of antenna modules. In some examples, the MIMO operation mode manager 1515 may determine a multiple input multiple output operation mode from the set of multiple input multiple output operation modes for each of the set of antenna modules at the UE, where the configuration indicates the determined multiple input multiple output operation mode from the set of multiple input multiple output operation modes for each of the set of antenna modules at the UE.

In some examples, the MIMO operation mode manager 1515 may switch from a first multiple input multiple output operation mode to a second multiple input multiple output operation mode based on the determined multiple input multiple output operation mode from the set of multiple input multiple output operation modes for each of the set of antenna modules at the UE. In some cases, the set of multiple input multiple output operation modes includes a polarization multiple input multiple output operation mode and a spatial multiple input multiple output operation mode. In some cases, the set of antenna modules includes antenna elements and one or more radio frequency front ends controlling the transmission or reception from the antenna elements.

The MIMO feedback manager 1520 may receive an indication of a requested beam management configuration, where the multiple input multiple output operation mode is determined, for the one or more of the set of antenna modules at the UE, based on the requested beam management configuration. In some cases, the requested beam management configuration indicates a requested multiple input multiple output operation mode for one or more of the set of antenna modules. In some cases, the requested beam management configuration indicates a set of transmission configuration indicator states for one or more of the set of antenna modules.

The TCI state manager 1525 may select a set of transmission configuration indicator states for one or more of the set of antenna modules at the UE, where the multiple input multiple output operation mode is determined, for the one or more of the set of antenna modules at the UE, based on the set of transmission configuration indicator states. In some cases, the set of transmission configuration indicator states is selected based on the received indication.

The network condition manager 1530 may determine a network condition, where the multiple input multiple output operation mode is determined, for the one or more of the set of antenna modules at the UE, based on the network condition. In some cases, the network condition includes a number of dominant clusters in a channel, a blockage condition associated with the channel, a network data rate threshold, a network latency threshold, a network beam management overhead threshold, a power consumption threshold, a thermal threshold, a maximum permissible exposure threshold, or a combination thereof.

Figure 16:
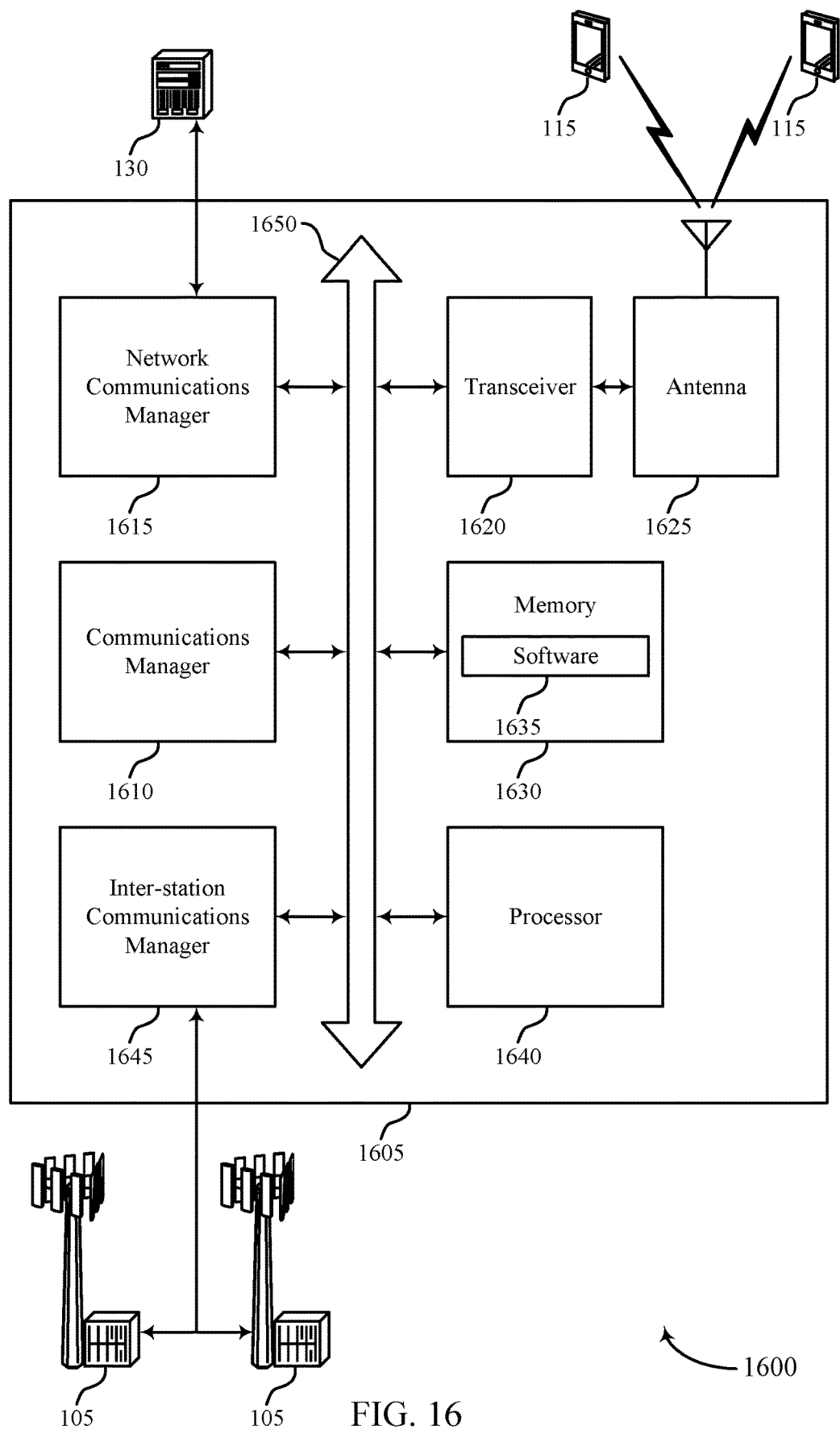
FIG. 16 shows a diagram of a system including a device that supports dynamic switching between different MIMO operation modes in accordance with aspects of the present disclosure.

FIG. 16 shows a diagram of a system 1600 including a device 1605 that supports dynamic switching between different MIMO operation modes in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may receive an indication of at least a subset of channel characteristics measured at a UE, at least a subset of UE characteristics at the UE, or both, determine, for one or more of a set of antenna modules at the UE, a multiple input multiple output operation mode from a set of multiple input multiple output operation modes for communicating with the UE over the one or more of the set of antenna modules, and transmit a configuration indicating the determined multiple input multiple output operation mode for the one or more of the set of antenna modules.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code or software 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting dynamic switching between different MIMO operation modes).

The inter-station communications manager 1645 may manage communications with other base station 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The software 1635 may include instructions to implement aspects of the present disclosure, including instructions to support wireless communications. The software 1635 may be stored in a non-transitory computer-readable medium such as system memory or other type of memory. In some cases, the software 1635 may not be directly executable by the processor 1640 but may cause a computer (e.g., when compiled and executed) to perform functions described herein.

Figure 17:
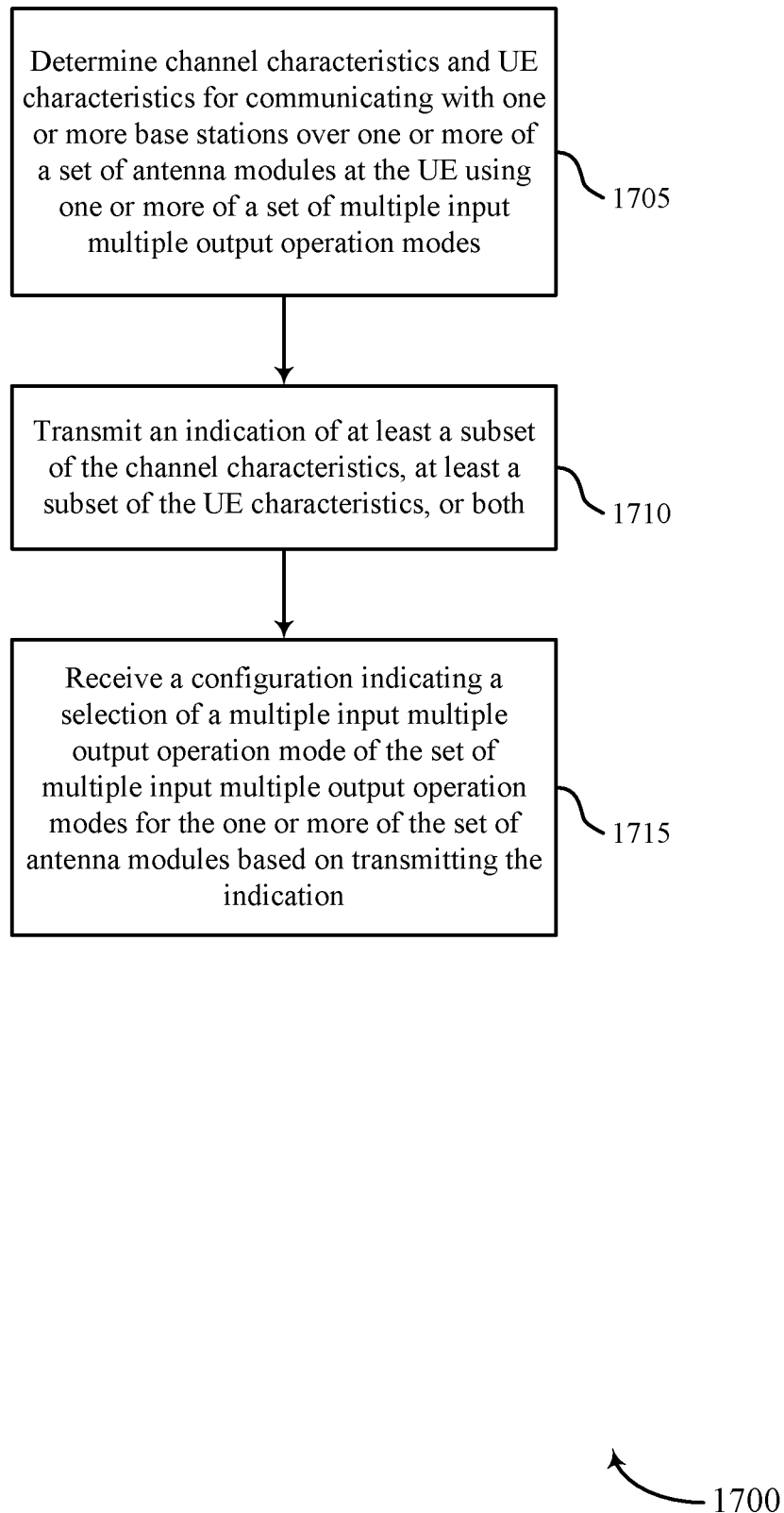
FIGS. 17 through 21 show flowcharts illustrating methods that support dynamic switching between different MIMO operation modes in accordance with aspects of the present disclosure.

FIG. 17 shows a flowchart illustrating a method 1700 that supports dynamic switching between different MIMO operation modes in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may determine channel characteristics and UE characteristics for communicating with one or more base stations over one or more of a set of antenna modules at the UE using one or more of a set of multiple input multiple output operation modes. The operations of 1705 may be performed according to the methods described herein. In some examples, aspects of the operations of 1705 may be performed by a MIMO information manager as described with reference to FIGS. 9 through 12.

At 1710, the UE may transmit an indication of at least a subset of the channel characteristics, at least a subset of the UE characteristics, or both. The operations of 1710 may be performed according to the methods described herein. In some examples, aspects of the operations of 1710 may be performed by a MIMO feedback manager as described with reference to FIGS. 9 through 12.

At 1715, the UE may receive a configuration indicating a selection of a multiple input multiple output operation mode of the set of multiple input multiple output operation modes for the one or more of the set of antenna modules based on transmitting the indication. The operations of 1715 may be performed according to the methods described herein. In some examples, aspects of the operations of 1715 may be performed by a MIMO operation mode manager as described with reference to FIGS. 9 through 12.

Figure 18:
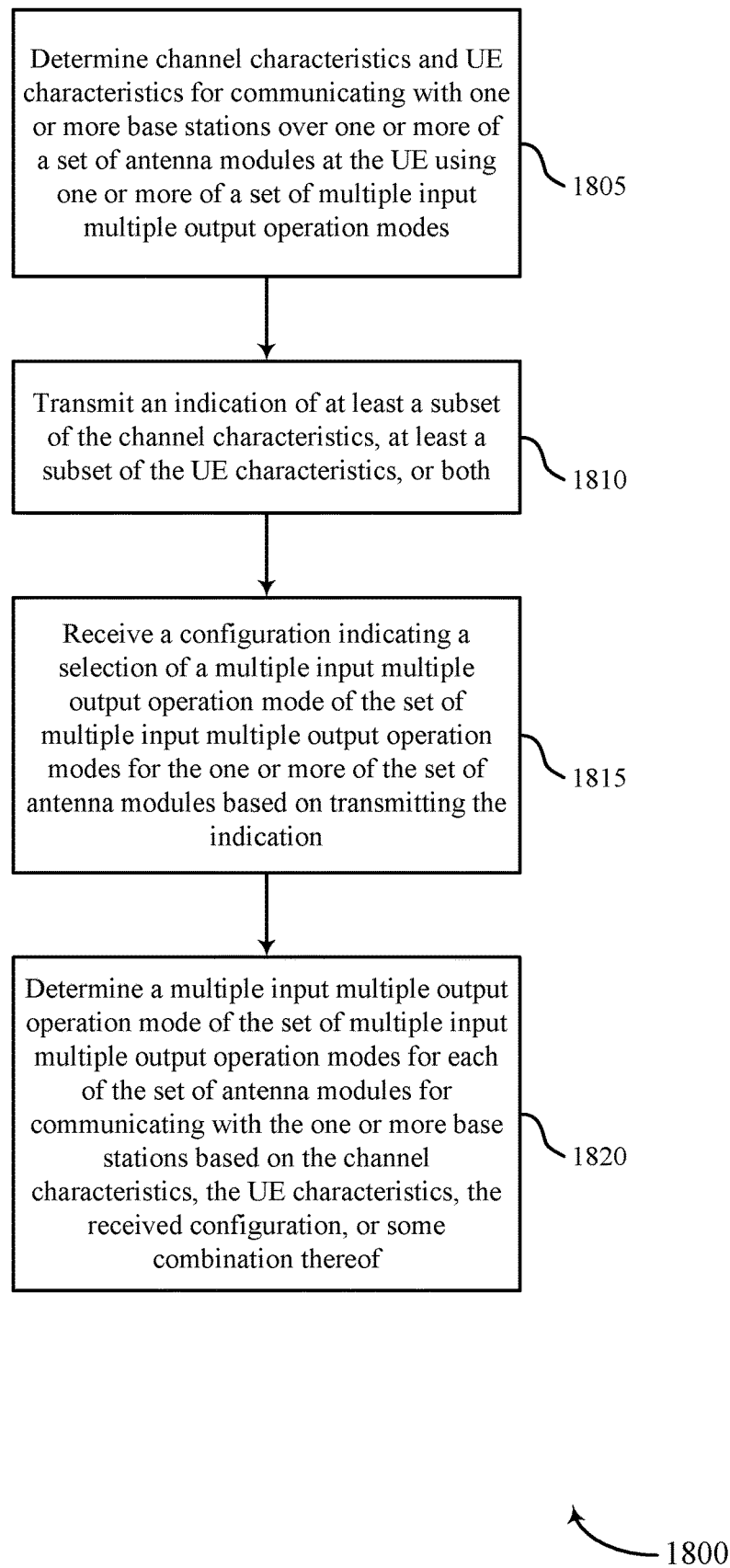

FIG. 18 shows a flowchart illustrating a method 1800 that supports dynamic switching between different MIMO operation modes in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may determine channel characteristics and UE characteristics for communicating with one or more base stations over one or more of a set of antenna modules at the UE using one or more of a set of multiple input multiple output operation modes. The operations of 1805 may be performed according to the methods described herein. In some examples, aspects of the operations of 1805 may be performed by a MIMO information manager as described with reference to FIGS. 9 through 12.

At 1810, the UE may transmit an indication of at least a subset of the channel characteristics, at least a subset of the UE characteristics, or both. The operations of 1810 may be performed according to the methods described herein. In some examples, aspects of the operations of 1810 may be performed by a MIMO feedback manager as described with reference to FIGS. 9 through 12.

At 1815, the UE may receive a configuration indicating a selection of a multiple input multiple output operation mode of the set of multiple input multiple output operation modes for the one or more of the set of antenna modules based on transmitting the indication. The operations of 1815 may be performed according to the methods described herein. In some examples, aspects of the operations of 1815 may be performed by a MIMO operation mode manager as described with reference to FIGS. 9 through 12.

At 1820, the UE may determine a multiple input multiple output operation mode of the set of multiple input multiple output operation modes for each of the set of antenna modules for communicating with the one or more base stations based on the channel characteristics, the UE characteristics, the received configuration, or some combination thereof. The operations of 1820 may be performed according to the methods described herein. In some examples, aspects of the operations of 1820 may be performed by a MIMO operation mode manager as described with reference to FIGS. 9 through 12.

Figure 19:
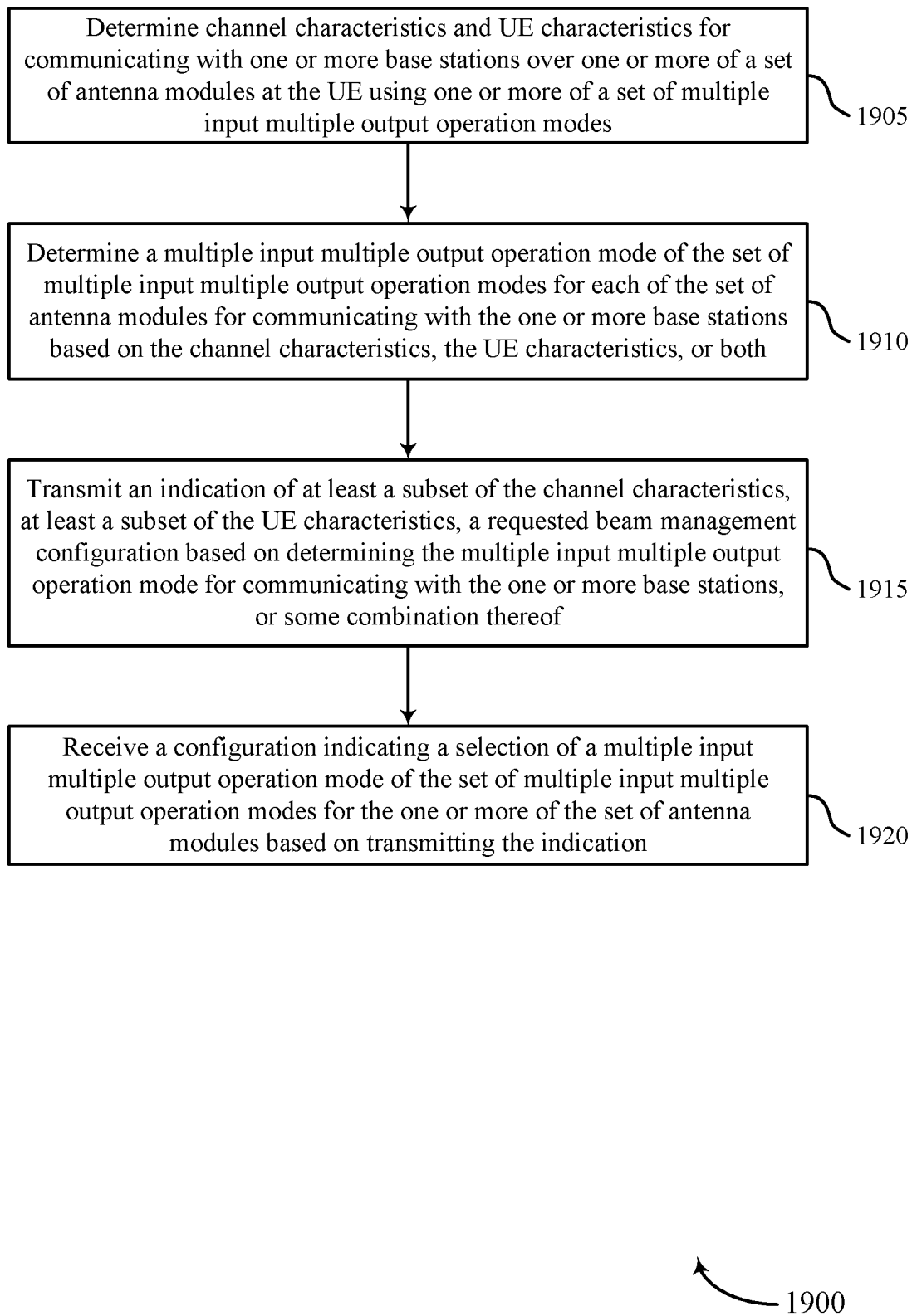

FIG. 19 shows a flowchart illustrating a method 1900 that supports dynamic switching between different MIMO operation modes in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may determine channel characteristics and UE characteristics for communicating with one or more base stations over one or more of a set of antenna modules at the UE using one or more of a set of multiple input multiple output operation modes. The operations of 1905 may be performed according to the methods described herein. In some examples, aspects of the operations of 1905 may be performed by a MIMO information manager as described with reference to FIGS. 9 through 12.

At 1910, the UE may determine a multiple input multiple output operation mode of the set of multiple input multiple output operation modes for each of the set of antenna modules for communicating with the one or more base stations based on the channel characteristics, the UE characteristics, or both. The operations of 1910 may be performed according to the methods described herein. In some examples, aspects of the operations of 1910 may be performed by a MIMO feedback manager as described with reference to FIGS. 9 through 12.

At 1915, the UE may transmit an indication of at least a subset of the channel characteristics, at least a subset of the UE characteristics, a requested beam management configuration based on determining the multiple input multiple output operation mode for communicating with the one or more base stations, or some combination thereof. The operations of 1915 may be performed according to the methods described herein. In some examples, aspects of the operations of 1915 may be performed by a beam management manager as described with reference to FIGS. 9 through 12.

At 1920, the UE may receive a configuration indicating a selection of a multiple input multiple output operation mode of the set of multiple input multiple output operation modes for the one or more of the set of antenna modules based on transmitting the indication. In some cases, the UE may switch from a first multiple input multiple output operation mode to a second multiple input multiple output operation mode based at least in part on receiving the configuration. The operations of 1920 may be performed according to the methods described herein. In some examples, aspects of the operations of 1920 may be performed by a MIMO operation mode manager as described with reference to FIGS. 9 through 12.

Figure 20:
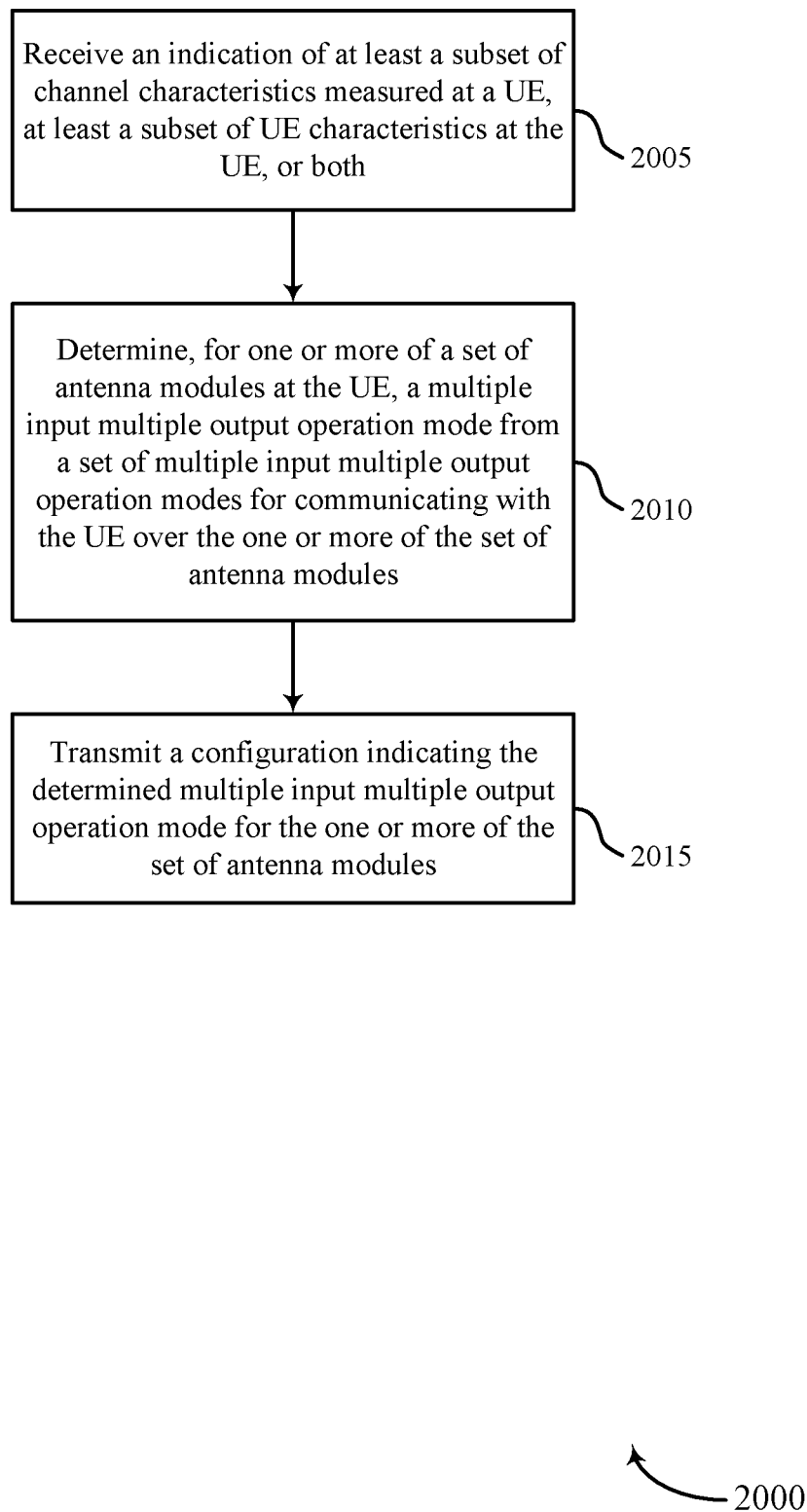

FIG. 20 shows a flowchart illustrating a method 2000 that supports dynamic switching between different MIMO operation modes in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may receive an indication of at least a subset of channel characteristics measured at a UE, at least a subset of UE characteristics at the UE, or both. The operations of 2005 may be performed according to the methods described herein. In some examples, aspects of the operations of 2005 may be performed by a MIMO information manager as described with reference to FIGS. 13 through 16.

At 2010, the base station may determine, for one or more of a set of antenna modules at the UE, a multiple input multiple output operation mode from a set of multiple input multiple output operation modes for communicating with the UE over the one or more of the set of antenna modules. The operations of 2010 may be performed according to the methods described herein. In some examples, aspects of the operations of 2010 may be performed by a MIMO operation mode manager as described with reference to FIGS. 13 through 16.

At 2015, the base station may transmit a configuration indicating the determined multiple input multiple output operation mode for the one or more of the set of antenna modules. The operations of 2015 may be performed according to the methods described herein. In some examples, aspects of the operations of 2015 may be performed by a MIMO operation mode manager as described with reference to FIGS. 13 through 16.

Figure 21:
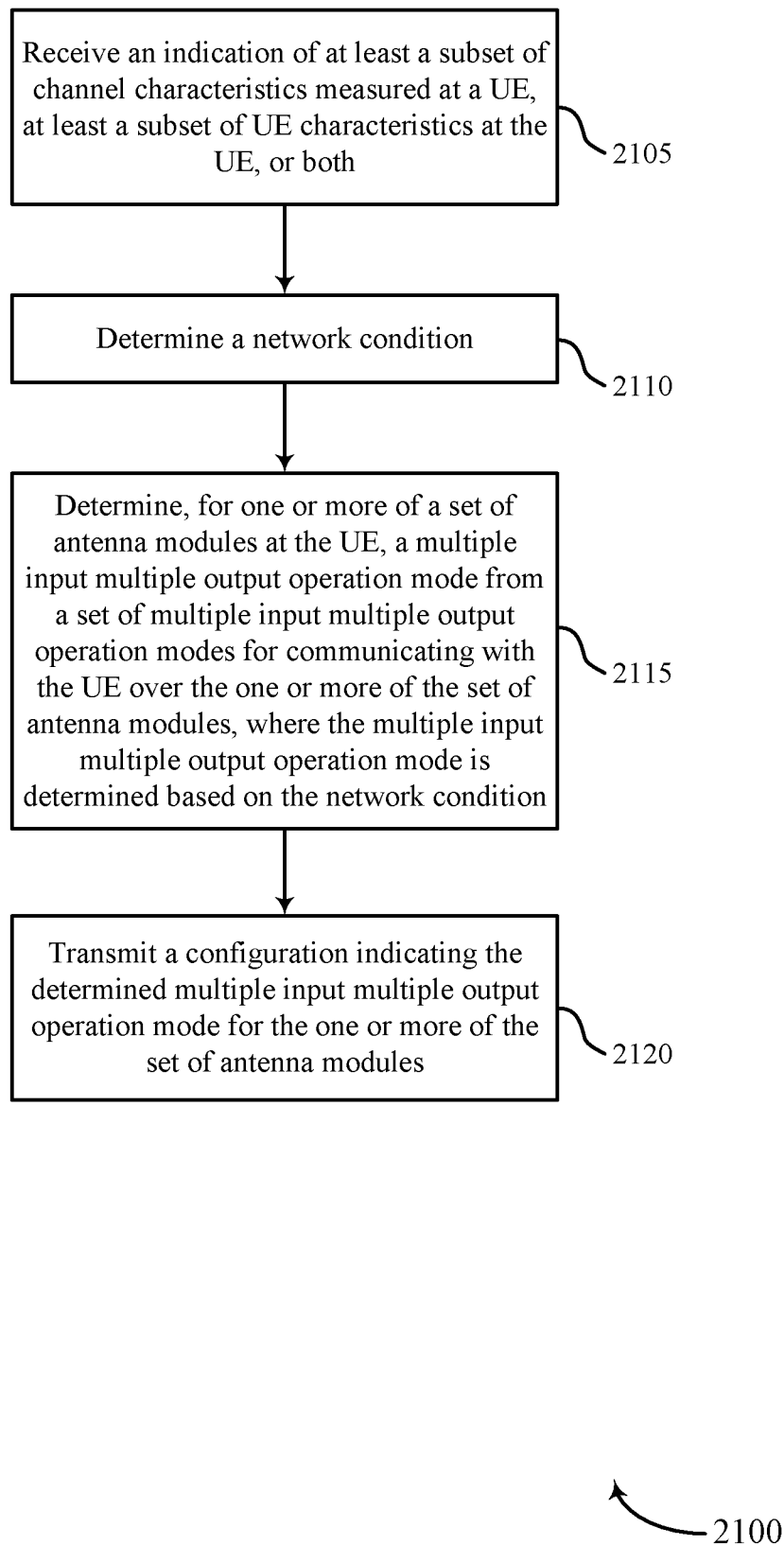

FIG. 21 shows a flowchart illustrating a method 2100 that supports dynamic switching between different MIMO operation modes in accordance with aspects of the present disclosure. The operations of method 2100 may be implemented by a base station 105 or its components as described herein. For example, the operations of method 2100 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may receive an indication of at least a subset of channel characteristics measured at a UE, at least a subset of UE characteristics at the UE, or both. The operations of 2105 may be performed according to the methods described herein. In some examples, aspects of the operations of 2105 may be performed by a MIMO information manager as described with reference to FIGS. 13 through 16.

At 2110, the base station may determine a network condition, where the multiple input multiple output operation mode is determined, for the one or more of the set of antenna modules at the UE, based on the network condition.

The operations of 2110 may be performed according to the methods described herein. In some examples, aspects of the operations of 2110 may be performed by a network condition manager as described with reference to FIGS. 13 through 16.

At 2115, the base station may determine, for one or more of a set of antenna modules at the UE, a multiple input multiple output operation mode from a set of multiple input multiple output operation modes for communicating with the UE over the one or more of the set of antenna modules (e.g., where the multiple input multiple output operation mode is determined based on the determined network condition). The operations of 2115 may be performed according to the methods described herein. In some examples, aspects of the operations of 2115 may be performed by a MIMO operation mode manager as described with reference to FIGS. 13 through 16.

At 2120, the base station may transmit a configuration indicating the determined multiple input multiple output operation mode for the one or more of the set of antenna modules. The operations of 2120 may be performed according to the methods described herein. In some examples, aspects of the operations of 2120 may be performed by a MIMO operation mode manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein. Thus, example 1 is a method for wireless communication at a UE that includes: determining channel characteristics and UE characteristics for communicating with one or more base stations over one or more of a plurality of antenna modules at the UE using one or more of a plurality of multiple input multiple output operation modes; transmitting an indication of at least a subset of the channel characteristics, at least a subset of the UE characteristics, or both; and receiving a configuration indicating a selection of a multiple input multiple output operation mode of the plurality of multiple input multiple output operation modes for the one or more of the plurality of antenna modules based at least in part on transmitting the indication.

In example 2, the method of example 1 may include determining a multiple input multiple output operation mode of the plurality of multiple input multiple output operation modes for each of the plurality of antenna modules for communicating with the one or more base stations based at least in part on the channel characteristics, the UE characteristics, or both.

In example 3, the method of examples 1-2 may include transmitting an indication of a requested beam management configuration based at least in part on determining the multiple input multiple output operation mode for communicating with the one or more base stations.

In example 4, in the method of examples 1-3, the requested beam management configuration indicates a requested multiple input multiple output operation mode for one or more of the plurality of antenna modules.

In example 5, in the method of examples 1-4, the requested beam management configuration indicates a set of transmission configuration indicator states for one or more of the plurality of antenna modules.

In example 6, the method of examples 1-5 may include switching from a first multiple input multiple output operation mode to a second multiple input multiple output operation mode based at least in part on receiving the configuration.

In example 7, determining the channel characteristics in the method of examples 1-6 may include measuring a signal quality of a plurality of receive beams transmitted from the one or more base stations and determining a number of dominant clusters in a channel based at least in part on measuring the signal quality of the plurality of receive beams.

In example 8, in the method of examples 1-7, the plurality of receive beams are based at least in part on a base station beam training procedure.

In example 9, determining the channel characteristics in the method of examples 1-8 may include determining blockage conditions at the UE and associated robustness thresholds based at least in part on the blockage conditions.

In example 10, in the method of examples 1-8, the blockage conditions are based at least in part on a measurement at the UE of a physical object blocking signal transmission or reception with the one or more base stations.

In example 11, determining the UE characteristics in the method of examples 1-9 may include determining one or more of a data rate threshold, a download latency threshold, an upload latency threshold, a beam management overhead threshold, a power consumption threshold, a thermal threshold, or a maximum permissible exposure threshold.

In example 12, in the method of examples 1-11, the data rate threshold is based at least in part on an application running at the UE.

In example 13, in the method of examples 1-12, the download latency threshold, the upload latency threshold, or both, are based at least in part on an application running at the UE.

In example 14, in the method of examples 1-13, the power consumption threshold is based at least in part on a power source measurement at the UE.

In example 15, in the method of examples 1-14, the thermal threshold is based at least in part on a thermal measurement at the UE.

In example 16, in the method of examples 1-15, the maximum permissible exposure threshold is based at least in part on an exposure or regulatory compliance requirement measurement at the UE.

In example 17, determining the UE characteristics in the method of examples 1-16 may include identifying an antenna array architecture for one or more of the plurality of antenna modules.

In example 18, in the method of examples 1-17, the plurality of multiple input multiple output operation modes comprises a polarization multiple input multiple output operation mode and a spatial multiple input multiple output operation mode.

In example 19, in the method of examples 1-18, the plurality of antenna modules comprises antenna elements and one or more radio frequency front ends controlling the transmission or reception from the antenna elements.

Example 20 is a method for wireless communication at base station that includes: receiving an indication of at least a subset of channel characteristics measured at a user equipment (UE), at least a subset of UE characteristics at the UE, or both; determining, for one or more of a plurality of antenna modules at the UE, a multiple input multiple output operation mode from a plurality of multiple input multiple output operation modes for communicating with the UE over the one or more of the plurality of antenna modules; and transmitting a configuration indicating the determined multiple input multiple output operation mode for the one or more of the plurality of antenna modules.

In example 21, the method of example 20 may include determining a multiple input multiple output operation mode from the plurality of multiple input multiple output operation modes for each of the plurality of antenna modules at the UE, where the configuration indicates the determined multiple input multiple output operation mode from the plurality of multiple input multiple output operation modes for each of the plurality of antenna modules at the UE.

In example 22, the method of examples 20-21 may include receiving an indication of a requested beam management configuration, where the multiple input multiple output operation mode is determined, for the one or more of the plurality of antenna modules at the UE, based at least in part on the requested beam management configuration.

In example 23, in the method of examples 20-22, the requested beam management configuration indicates a requested multiple input multiple output operation mode for one or more of the plurality of antenna modules.

In example 24, in the method of examples 20-23, the requested beam management configuration indicates a set of transmission configuration indicator states for one or more of the plurality of antenna modules.

In example 25, the method of examples 20-24 may include switching from a first multiple input multiple output operation mode to a second multiple input multiple output operation mode based at least in part on the determined multiple input multiple output operation mode from the plurality of multiple input multiple output operation modes for each of the plurality of antenna modules at the UE.

In example 26, in the method of examples 20-25, the subset of channel characteristics measured at the UE comprises one or more of a signal quality of a plurality of receive beams transmitted from one or more base stations, a number of dominant clusters in a channel, or a blockage condition at the UE and an associated robustness threshold based at least in part on the blockage condition.

In example 27, in the method of examples 20-26, the subset of UE characteristics at the UE comprises one or more of a data rate threshold, a download latency threshold, an upload latency threshold, a beam management overhead threshold, a power consumption threshold, a thermal threshold, or a maximum permissible exposure threshold.

In example 28, in the method of examples 20-27, the subset of UE characteristics at the UE comprises an antenna array architecture description for one or more of the plurality of antenna modules at the UE.

In example 29, in the method of examples 20-28, the plurality of multiple input multiple output operation modes comprises a polarization multiple input multiple output operation mode and a spatial multiple input multiple output operation mode.

In example 30, in the method of examples 20-29, the plurality of antenna modules comprises antenna elements and one or more radio frequency front ends controlling the transmission or reception from the antenna elements.

In example 31, the method of examples 20-30 may include selecting a set of transmission configuration indicator states for one or more of the plurality of antenna modules at the UE, where the multiple input multiple output operation mode is determined, for the one or more of the plurality of antenna modules at the UE, based at least in part on the set of transmission configuration indicator states.

In example 32, in the method of examples 20-31, the set of transmission configuration indicator states is selected based at least in part on the received indication.

In example 33, the method of examples 20-32 may include determining a network condition, where the multiple input multiple output operation mode is determined, for the one or more of the plurality of antenna modules at the UE, based at least in part on the network condition.

In example 34, in the method of examples 20-33, the network condition comprises one or more of a number of dominant clusters in a channel, a blockage condition associated with the channel, a network data rate threshold, a network latency threshold, a network beam management overhead threshold, a power consumption threshold, a thermal threshold, or a maximum permissible exposure threshold.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   determining channel characteristics and UE characteristics for communicating with one or more base stations over one or more of a plurality of antenna modules at the UE using one or more of a plurality of multiple input multiple output operation modes, wherein the plurality of multiple input multiple output operation modes comprises a polarization multiple input multiple output operation mode and a spatial multiple input multiple output operation mode;

transmitting an indication of at least a subset of the channel characteristics, at least a subset of the UE characteristics, or both; and receiving a configuration indicating a selection of a multiple input multiple output operation mode of the plurality of multiple input multiple output operation modes for the one or more of the plurality of antenna modules based at least in part on transmitting the indication.

2. The method of claim 1, further comprising:

determining a multiple input multiple output operation mode of the plurality of multiple input multiple output operation modes for each of the plurality of antenna modules for communicating with the one or more base stations based at least in part on the channel characteristics, the UE characteristics, or both.

3. The method of claim 2, further comprising:

transmitting an indication of a requested beam management configuration based at least in part on determining the multiple input multiple output operation mode for communicating with the one or more base stations.

4. The method of claim 3, wherein the requested beam management configuration indicates a requested multiple input multiple output operation mode, a set of transmission configuration indicator states, or some combination thereof, for one or more of the plurality of antenna modules.

5. The method of claim 1, further comprising:

switching from a first multiple input multiple output operation mode to a second multiple input multiple output operation mode based at least in part on receiving the configuration.

6. The method of claim 1, wherein determining the channel characteristics comprises:

measuring a signal quality of a plurality of receive beams transmitted from the one or more base stations, wherein the plurality of receive beams are based at least in part on a base station beam training procedure; and determining a number of dominant clusters in a channel based at least in part on measuring the signal quality of the plurality of receive beams.

7. The method of claim 1, wherein determining the channel characteristics comprises:

determining blockage conditions at the UE and associated robustness thresholds based at least in part on the blockage conditions.

8. The method of claim 7, wherein the blockage conditions are based at least in part on a measurement at the UE of a physical object blocking signal transmission or reception with the one or more base stations.

9. The method of claim 1, wherein determining the UE characteristics comprises:

determining one or more of a data rate threshold, a download latency threshold, an upload latency threshold, a beam management overhead threshold, a power consumption threshold, a thermal threshold, or a maximum permissible exposure threshold.

10. The method of claim 9, wherein the data rate threshold is based at least in part on an application running at the UE.

11. The method of claim 9, wherein the download latency threshold, the upload latency threshold, or both, are based at least in part on an application running at the UE.

12. The method of claim 9, wherein the power consumption threshold is based at least in part on a power source measurement at the UE.

13. The method of claim 9, wherein the thermal threshold is based at least in part on a thermal measurement at the UE.

14. The method of claim 9, wherein the maximum permissible exposure threshold is based at least in part on an exposure or regulatory compliance requirement measurement at the UE.

15. The method of claim 1, wherein determining the UE characteristics comprises:

identifying an antenna array architecture for one or more of the plurality of antenna modules.

16. The method of claim 1, wherein the plurality of antenna modules comprises antenna elements and one or more radio frequency front ends controlling the transmission or reception from the antenna elements.

17. A method for wireless communications, comprising:

receiving an indication of at least a subset of channel characteristics measured at a user equipment (UE), at least a subset of UE characteristics at the UE, or both;

determining, for one or more of a plurality of antenna modules at the UE, a multiple input multiple output operation mode from a plurality of multiple input multiple output operation modes for communicating with the UE over the one or more of the plurality of antenna modules, wherein the plurality of multiple input multiple output operation modes comprises a polarization multiple input multiple output operation mode and a spatial multiple input multiple output operation mode; and transmitting a configuration indicating the determined multiple input multiple output operation mode for the one or more of the plurality of antenna modules.

18. The method of claim 17, further comprising:

determining a multiple input multiple output operation mode from the plurality of multiple input multiple output operation modes for each of the plurality of antenna modules at the UE, wherein the configuration indicates the determined multiple input multiple output operation mode from the plurality of multiple input multiple output operation modes for each of the plurality of antenna modules at the UE.

19. The method of claim 17, further comprising:

receiving an indication of a requested beam management configuration, wherein the multiple input multiple output operation mode is determined, for the one or more of the plurality of antenna modules at the UE, based at least in part on the requested beam management configuration.

20. The method of claim 19, wherein the requested beam management configuration indicates a requested multiple input multiple output operation mode, a set of transmission configuration indicator states, or some combination thereof, for one or more of the plurality of antenna modules.

21. The method of claim 17, further comprising:

switching from a first multiple input multiple output operation mode to a second multiple input multiple output operation mode based at least in part on the determined multiple input multiple output operation mode from the plurality of multiple input multiple output operation modes for each of the plurality of antenna modules at the UE.

22. The method of claim 17, wherein the subset of channel characteristics measured at the UE comprises one or more of a signal quality of a plurality of receive beams transmitted from one or more base stations, a number of dominant clusters in a channel, or a blockage condition at the UE and an associated robustness threshold based at least in part on the blockage condition.

23. The method of claim 17, wherein the subset of UE characteristics at the UE comprises one or more of a data rate threshold, a download latency threshold, an upload latency threshold, a beam management overhead threshold, a power consumption threshold, a thermal threshold, or a maximum permissible exposure threshold.

24. The method of claim 17, wherein the subset of UE characteristics at the UE comprises an antenna array architecture description for one or more of the plurality of antenna modules at the UE.

25. The method of claim 17, further comprising:
selecting a set of transmission configuration indicator states for one or more of the plurality of antenna modules at the UE, wherein the multiple input multiple output operation mode is determined, for the one or more of the plurality of antenna modules at the UE, based at least in part on the set of transmission configuration indicator states.

26. The method of claim 17, further comprising:
determining a network condition, wherein the multiple input multiple output operation mode is determined, for the one or more of the plurality of antenna modules at the UE, based at least in part on the network condition.

27. The method of claim 26, wherein the network condition comprises one or more of a number of dominant clusters in a channel, a blockage condition associated with the channel, a network data rate threshold, a network latency threshold, a network beam management overhead threshold, a power consumption threshold, a thermal threshold, a maximum permissible exposure threshold.

28. An apparatus for wireless communications at a user equipment (UE), comprising: a processor, memory in electronic communication with the processor; and instructions stored in the memory and executable by the processor to cause the apparatus to:
determine channel characteristics and UE characteristics for communicating with one or more base stations over one or more of a plurality of antenna modules at the UE using one or more of a plurality of multiple input multiple output operation modes, wherein the plurality of multiple input multiple output operation modes comprises a polarization multiple input multiple output operation mode and a spatial multiple input multiple output operation mode;

transmit an indication of at least a subset of the channel characteristics, at least a subset of the UE characteristics, or both; and receive a configuration indicating a selection of a multiple input multiple output operation mode of the plurality of multiple input multiple output operation modes for the one or more of the plurality of antenna modules based at least in part on transmitting the indication.

29. An apparatus for wireless communications, comprising: a processor, memory in electronic communication with the processor; and instructions stored in the memory and executable by the processor to cause the apparatus to:

receive an indication of at least a subset of channel characteristics measured at a user equipment (UE), at least a subset of UE characteristics at the UE, or both;

determine, for one or more of a plurality of antenna modules at the UE, a multiple input multiple output operation mode from a plurality of multiple input multiple output operation modes for communicating with the UE over the one or more of the plurality of antenna modules, wherein the plurality of multiple input multiple output operation modes comprises a polarization multiple input multiple output operation mode and a spatial multiple input multiple output operation mode; and transmit a configuration indicating the determined multiple input multiple output operation mode for the one or more of the plurality of antenna modules.

* * * * *